US012757093B2

(12) United States Patent
Li et al.

(10) Patent No.: US 12,757,093 B2
(45) Date of Patent: Oct. 6, 2026

(54) COMMUNICATION METHOD AND APPARATUS

(71) Applicant: HUAWEI TECHNOLOGIES CO., LTD., Shenzhen (CN)

(72) Inventors: Yongcui Li, Beijing (CN); Zehao Chen, Shenzhen (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 18/619,591

(22) Filed: Mar. 28, 2024

(65) Prior Publication Data

US 2024/0244497 A1 Jul. 18, 2024

Related U.S. Application Data

(63) Continuation of application No. PCT/CN2022/121189, filed on Sep. 26, 2022.

(30) Foreign Application Priority Data

Sep. 30, 2021 (CN) .......................... 202111166458.0

(51) Int. Cl.
*H04W 4/00* (2018.01)
*H04W 8/02* (2009.01)
*H04W 36/22* (2009.01)

(52) U.S. Cl.
CPC ............. *H04W 36/22* (2013.01); *H04W 8/02* (2013.01)

(58) Field of Classification Search
CPC ....... H04W 36/22; H04W 8/02; H04W 8/082; H04W 28/0925; H04W 88/14;
(Continued)

(56) References Cited

U.S. PATENT DOCUMENTS 8,432,871 B1 * 4/2013 Sarnaik ................. H04W 76/12 370/331
9,325,621 B1 * 4/2016 Ramamurthy ........ H04W 36/22
(Continued)

FOREIGN PATENT DOCUMENTS

CN 108419270 A 8/2018
CN 112584437 A 3/2021
(Continued)

OTHER PUBLICATIONS

3GPP TS 23.501 V1.3.0 (Sep. 2017), 3rd Generation Partnership Project; Technical Specification Group Services and System Aspects; System Architecture for the 5G System; Stage 2 (Release 15), total 174 pages.

(Continued)

*Primary Examiner* — Phuongchau Ba Nguyen
(74) *Attorney, Agent, or Firm* — Rimon PC

(57) ABSTRACT

This application provides a communication method and apparatus. The method may include: A first session management network element determines an offloading point in a visited network based on first information, where the first information indicates that offloading is allowed in the visited network, and the first session management network element is a network element deployed in the visited network; and the first session management network element sends an offloading rule to the offloading point, where the offloading rule is for offloading a packet to the visited network. According to this application, after accessing the visited network through HR roaming, a terminal device may access a service in the visited network by using the offloading point determined by the first session management network element, to implement local offloading in the visited network.

18 Claims, 6 Drawing Sheets

(58) Field of Classification Search
CPC ... H04W 8/12; H04W 28/0846; H04W 28/10; H04W 80/04; H04W 36/18; H04W 36/0011; H04W 36/14; H04W 36/08
See application file for complete search history.

(56) References Cited

U.S. PATENT DOCUMENTS

| | | | | |
|---|---|---|---|---|
| 9,414,305 | B2 * | 8/2016 | Pankajakshan | H04W 48/18 |
| 9,913,169 | B2 * | 3/2018 | Forssell | H04W 36/22 |
| 2011/0075557 | A1 * | 3/2011 | Chowdhury | H04L 12/14 370/235 |
| 2016/0198364 | A1 * | 7/2016 | Schwarzbauer | H04W 28/10 370/331 |
| 2021/0289390 | A1 * | 9/2021 | Zhou | H04W 28/0933 |

FOREIGN PATENT DOCUMENTS

| | | | |
|---|---|---|---|
| EP | 3637811 | A1 | 4/2020 |
| EP | 3661259 | A1 | 6/2020 |
| WO | 2021017381 | A1 | 2/2021 |

OTHER PUBLICATIONS

SA WG2 Meeting #122, S2-174542, "SMF selection in roaming case", Huawei, HiSilicon, Jun. 26-30, 2017, San Jose Del Cabo, Mexico, total 13 pages.

3GPP TSG-SA WG2 Meeting #131, S2-1901985, "ETSUN Xn handover", ZTE, Feb. 25-Mar. 1, 2019, Santa Cruz—Tenerife, Spain, total 4 pages.

Huawei et al: "3GPP TSG-SA2 Meeting #145E S2-2104498 May 17-28, 2021, Electronic meeting," total 4 pages.

CATT: "Update of PDU session establishment procedure," 3GPP TSG SA WG2 Meeting #120 S2-172639 Mar. 27-31, 2017, Busan, Korea, total 8 pages.

3rd Generation Partnership Project; Technical Specification Group Services and System Aspects; System architecture for the 5G System (5GS); Stage 2 (Release 17), 3GPP TS 23.501 V17.2.0 (Sep. 2021), total 542 pages.

LG Electronics: "TS 23.502: Update of Session Establishment Procedure for Home Routed roaming—including subscription info access in vSMF," SA WG2 Meeting #119 S2-171459 Feb. 13-17, 2017, Dubrovnik, Croatia, total 3 pages.

3rd Generation Partnership Project; Technical Specification Group Services and System Aspects; 5G System Enhancements for Edge Computing; Stage 2 (Release 17), 3GPP TS 23.548 V17.0.0 (Sep. 2021), total 52 pages.

SA WG2 Meeting #122bis S2-175535,"Definition on PCC support for 5GC in TS 23.501," Nokia,Alcatel-Lucent Shanghai Bell, Aug. 21-25, 2017, Sophia-Antipolis, France; 47 total pages.

* cited by examiner

COMMUNICATION METHOD AND APPARATUS

CROSS-REFERENCE TO RELATED APPLICATIONS

This application is a continuation of International Application No. PCT/CN2022/121189, filed on Sep. 26, 2022, which claims priority to Chinese Patent Application No. 202111166458.0, filed on Sep. 30, 2021. The disclosures of the aforementioned applications are hereby incorporated by reference in their entireties.

TECHNICAL FIELD

This application relates to the field of communications, and more specifically, to a communication method and apparatus.

BACKGROUND

In an edge computing (EC) deployment scenario, some services may be provided by a plurality of edge application servers (EASs) deployed at a network edge. The plurality of EASs may provide the same services and content, and most of the EASs have different internet protocol (IP) addresses. In the EC scenario, when a user equipment (UE) requests to access the service, the user equipment is required to access an available EAS that is close to the UE. Therefore, an appropriate IP address of the EAS is important.

In some cases, the UE may leave a coverage area of a home public land mobile network (PLMN) (home PLMN, HPLMN), and access a visited public land mobile network (VPLMN) through home routed (HR) roaming, and the VPLMN provides a service for the UE.

SUMMARY

This application provides a communication method and apparatus, so that a session management network element in a VPLMN determines an offloading point, and sends an offloading rule to the offloading point. In this way, a roaming UE can access a service in the VPLMN by using the offloading point.

According to a first aspect, a communication method is provided. The method may be performed by a core network element, or may be performed by a component (for example, a chip or a circuit) of the core network element. This is not limited. For ease of description, an example in which the method is performed by a first session management network element is used below for description.

The method may include: The first session management network element determines an offloading point in a visited network based on first information, where the first information indicates that offloading is allowed in the visited network, and the first session management network element is a network element deployed in the visited network; and the first session management network element sends an offloading rule to the offloading point, where the offloading rule is for offloading a packet to the visited network.

Based on the foregoing solution, the first session management network element deployed in the visited network may determine the offloading point based on the first information, and send the offloading rule to the offloading point. In this way, after accessing the visited network through HR roaming, a terminal device may access a service in the visited network by using the offloading point determined by the first session management network element and the offloading rule sent to the offloading point, to implement local offloading in the visited network. In addition, a packet for accessing an EAS may be further offloaded to the visited network by using the offloading point, so that after accessing the visited network through HR roaming, the terminal device can further access an edge service in the visited network.

With reference to the first aspect, in some implementations of the first aspect, the method further includes: The first session management network element determines the offloading rule based on a first service, where the first service is a service that is allowed to be offloaded in the visited network.

Based on the foregoing technical solution, the first session management network element may determine the offloading rule based on a fully qualified domain name corresponding to the service that is allowed to be offloaded in the visited network. In other words, the offloading rule is for offloading, to the visited network, the service that is allowed to be offloaded in the visited network. In this way, according to the offloading rule, when an identifier of the first service is a fully qualified domain name, and a fully qualified domain name of a service matches a target fully qualified domain name, local offloading is performed on the service in the visited network.

With reference to the first aspect, in some implementations of the first aspect, the first information includes an identifier of the first service, and the first information indicates that the first service is allowed to be offloaded in the visited network.

For example, the identifier of the first service may be a fully qualified domain name (or a fully qualified domain name range), an application identifier, an IP address of an application server, or a port number.

Based on the foregoing technical solution, the first information indicates that the first service is allowed to be offloaded in the visited network, and correspondingly, the offloading rule is for offloading, to the visited network, the service that is allowed to be offloaded in the visited network.

With reference to the first aspect, in some implementations of the first aspect, the method further includes: The first session management network element determines the offloading rule based on configuration information and/or the first information.

Based on the foregoing technical solution, the first session management network element determines the offloading rule based on the configuration information and/or the first information. In this way, the determined offloading rule can match the configuration information and/or the first information, so that the terminal device can normally access the edge service in the visited network.

With reference to the first aspect, in some implementations of the first aspect, the method further includes: The first session management network element receives the first information from a second session management network element, where the second session management network element is a network element deployed in a home network; or the first session management network element locally configures the first information.

Based on the foregoing technical solution, the first session management network element may locally configure the first information, or may receive the first information from another network element (for example, the second session management network element).

According to a second aspect, a communication method is provided. The method may be performed by a core network element, or may be performed by a component (for example, a chip or a circuit) of the core network element. This is not limited. For ease of description, an example in which the method is performed by a first session management network element is used below for description.

The method may include: The first session management network element determines an offloading point in a visited network, where the first session management network element is a network element deployed in the visited network; the first session management network element sends an offloading rule to the offloading point, where the offloading rule is for offloading a packet to the visited network; and the first session management network element receives first information, where the first information indicates whether offloading is allowed in the visited network.

Based on the foregoing solution, the first session management network element deployed in the visited network may determine the offloading point, and send the offloading rule to the offloading point. In this way, after accessing the visited network through HR roaming, a terminal device may access a service in the visited network by using the offloading point determined by the first session management network element, to implement local offloading in the visited network. In addition, a packet for accessing an EAS may be further offloaded to the visited network by using the offloading point, so that after accessing the visited network through HR roaming, the terminal device can further access an edge service in the visited network. In addition, the first session management network element may receive the first information, and may further process the offloading point or the offloading rule based on the first information. In other words, the first session management network element may first determine the offloading point in the visited network, and may process the offloading point or the offloading rule based on the first information after determining the offloading point, to meet a requirement of the first information.

With reference to the second aspect, in some implementations of the second aspect, the method further includes: The first session management network element deletes or updates the offloading rule based on the first information.

With reference to the second aspect, in some implementations of the second aspect, that the first session management network element deletes or updates the offloading rule based on the first information includes: If the first information indicates that offloading is not allowed in the visited network, the first session management network element deletes the offloading rule.

Based on the foregoing technical solution, if the first information indicates that offloading is not allowed in the visited network, the first session management network element may delete the offloading rule. In this way, the offloading rule can meet the requirement of the first information.

With reference to the second aspect, in some implementations of the second aspect, that the first session management network element deletes or updates the offloading rule based on the first information includes: If the first information indicates that a first service is allowed to be offloaded in the visited network, the first session management network element updates the offloading rule based on the first service.

Based on the foregoing technical solution, if the first information indicates that a packet corresponding to the first service is allowed to be offloaded in the visited network, the first session management network element updates the offloading rule based on the first service, or it may be understood as that the first session management network element re-determines an offloading rule based on the first service, to enable the determined offloading rule to meet the requirement of the first information.

With reference to the second aspect, in some implementations of the second aspect, the method further includes: The first session management network element deletes or updates the offloading point based on the first information.

With reference to the second aspect, in some implementations of the second aspect, that the first session management network element deletes or updates the offloading point based on the first information includes: If the first information indicates that offloading is not allowed in the visited network, the first session management network element deletes the offloading point.

Based on the foregoing technical solution, if the first information indicates that offloading is not allowed in the visited network, the first session management network element may delete the offloading point. In this way, the offloading point can meet the requirement of the first information.

With reference to the second aspect, in some implementations of the second aspect, that the first session management network element deletes or updates the offloading point based on the first information includes: If the first information indicates that a first service is allowed to be offloaded in the visited network, the first session management network element updates the offloading point based on the first service.

Based on the foregoing technical solution, if the first information indicates that a packet corresponding to the first service is allowed to be offloaded in the visited network, the first session management network element updates the offloading point based on the first service, or it may be understood as that the first session management network element re-selects an offloading point based on the first service, to enable the re-selected offloading point to be more suitable for the packet corresponding to the first service.

With reference to the second aspect, in some implementations of the second aspect, after the first session management network element deletes or updates the offloading point, the method further includes: The first session management network element sends updated tunnel information to a second session management network element.

With reference to the second aspect, in some implementations of the second aspect, that the first session management network element receives first information includes: The first session management network element receives the first information from the second session management network element, where the second session management network element is a network element deployed in a home network.

With reference to the first aspect or the second aspect, in some implementations, the offloading rule includes address information of an edge application server, and the offloading rule is for offloading a packet within a range of the edge application server to the visited network.

With reference to the first aspect or the second aspect, in some implementations, the offloading point is an uplink classifier or a branching point.

According to a third aspect, a communication method is provided. The method may be performed by a core network element, or may be performed by a component (for example, a chip or a circuit) of the core network element. This is not limited. For ease of description, an example in which the method is performed by a second session management network element is used below for description.

The method may include: The second session management network element obtains first information, where the first information indicates whether offloading is allowed in a visited network; and the second session management network element sends the first information to a first session management network element, where the first session management network element is a network element deployed in the visited network, and the second session management network element is a network element deployed in a home network.

Based on the foregoing solution, the second session management network element deployed in the home network sends the first information to the first session management network element deployed in the visited network, where the first information indicates that offloading is allowed in the visited network. In this method, the first session management network element deployed in the visited network may learn that local offloading is allowed in the visited network, so that the first session management network element can perform some operations, for example, determine an offloading point, to access a service in the visited network.

With reference to the third aspect, in some implementations of the third aspect, the method further includes: The second session management network element sends an identifier of a first service to the first session management network element, where the first service is a service that is allowed to be offloaded in the visited network.

With reference to the third aspect, in some implementations of the third aspect, the first information includes the identifier of the first service, and the first information indicates that the first service is allowed to be offloaded in the visited network.

With reference to the third aspect, in some implementations of the third aspect, that the second session management network element obtains first information includes: The second session management network element receives the first information from a policy control network element, where the policy control network element is a network element deployed in the home network; or the second session management network element locally configures the first information.

According to a fourth aspect, a communication method is provided. The method may be performed by a core network element, or may be performed by a component (for example, a chip or a circuit) of the core network element. This is not limited. For ease of description, an example in which the method is performed by a policy control network element is used below for description.

The method may include: The policy control network element obtains first information, where the first information indicates whether offloading is allowed in a visited network; and the policy control network element sends the first information to a second session management network element, where the second session management network element and the policy control network element are network elements deployed in a home network.

Based on the foregoing solution, the policy control network element deployed in the home network sends the first information to the second session management network element deployed in the home network, where the first information indicates whether offloading is allowed in the visited network. In this method, the second session management network element deployed in the home network may learn whether offloading is allowed in the visited network, so that the second session management network element can perform some operations, for example, send the first information to a first session management network element.

With reference to the fourth aspect, in some implementations of the fourth aspect, the method further includes: The policy control network element sends an identifier of a first service to the second session management network element, where the first service is a service that is allowed to be offloaded in the visited network.

With reference to the fourth aspect, in some implementations of the fourth aspect, the first information includes the identifier of the first service, and the first information indicates that the first service is allowed to be offloaded in the visited network.

According to a fifth aspect, a communication apparatus is provided. The apparatus is configured to perform the method according to any one of the possible implementations of the first aspect to the fourth aspect. Specifically, the apparatus may include a unit and/or a module configured to perform the method according to any one of the possible implementations of the first aspect to the fourth aspect, for example, a processing unit and/or a communication unit.

In an implementation, the apparatus is a core network element. When the apparatus is the core network element, the communication unit may be a transceiver or an input/output interface, and the processing unit may be at least one processor. Optionally, the transceiver may be a transceiver circuit. Optionally, the input/output interface may be an input/output circuit.

In another implementation, the apparatus is a chip, a chip system, or a circuit used in the core network element. When the apparatus is the chip, the chip system, or the circuit used in the core network element, the communication unit may be an input/output interface, an interface circuit, an output circuit, an input circuit, a pin, a related circuit, or the like in the chip, the chip system, or the circuit. The processing unit may be at least one processor, a processing circuit, a logic circuit, or the like.

According to a sixth aspect, a communication apparatus is provided. The apparatus includes at least one processor, configured to execute a computer program or instructions stored in a memory, to perform the method according to any one of the possible implementations of the first aspect to the fourth aspect. Optionally, the apparatus further includes the memory, configured to store the computer program or the instructions. Optionally, the apparatus further includes a communication interface, and the processor reads, through the communication interface, the computer program or the instructions stored in the memory.

In an implementation, the apparatus is a core network element.

In another implementation, the apparatus is a chip, a chip system, or a circuit used in the core network element.

According to a seventh aspect, this application provides a processor, configured to perform the methods provided in the foregoing aspects.

Unless otherwise specified, or if operations such as sending and obtaining/receiving related to the processor do not conflict with an actual function or internal logic of the processor in related descriptions, the operations may be understood as operations such as outputting, receiving, and inputting of the processor, or may be understood as sending and receiving operations performed by a radio frequency circuit and an antenna. This is not limited in this application.

According to an eighth aspect, a computer-readable storage medium is provided, where the computer-readable medium stores program code executed by a device, and the program code is for performing the method according to any one of the possible implementations of the first aspect to the fourth aspect.

According to a ninth aspect, a computer program product including instructions is provided. When the computer program product runs on a computer, the computer is enabled to perform the method according to any one of the possible implementations of the first aspect to the fourth aspect.

According to a tenth aspect, a communication system is provided, and includes one or more of the foregoing first session management network element, the foregoing second session management network element, and the foregoing policy control network element.

DESCRIPTION OF EMBODIMENTS

The following describes technical solutions of this application with reference to the accompanying drawings.

The technical solutions provided in embodiments of this application may be applied to various communication systems, for example, a 5th generation (5G) system or a new radio (NR) system, a long term evolution (LTE) system, an LTE frequency division duplex (FDD) system, or an LTE time division duplex (TDD) system. The technical solutions provided in this application may be further applied to a future communication system, for example, a 6th generation mobile communication system. The technical solutions provided in this application may be further applied to device-to-device (D2D) communication, vehicle-to-everything (V2X) communication, machine-to-machine (M2M) communication, or machine type communication (machine type communication, MTC), and an internet of things (IoT) communication system, or another communication system.

First, a network architecture applicable to this application is briefly described with reference to FIG. 1 and FIG. 2 below.

Figure 1:
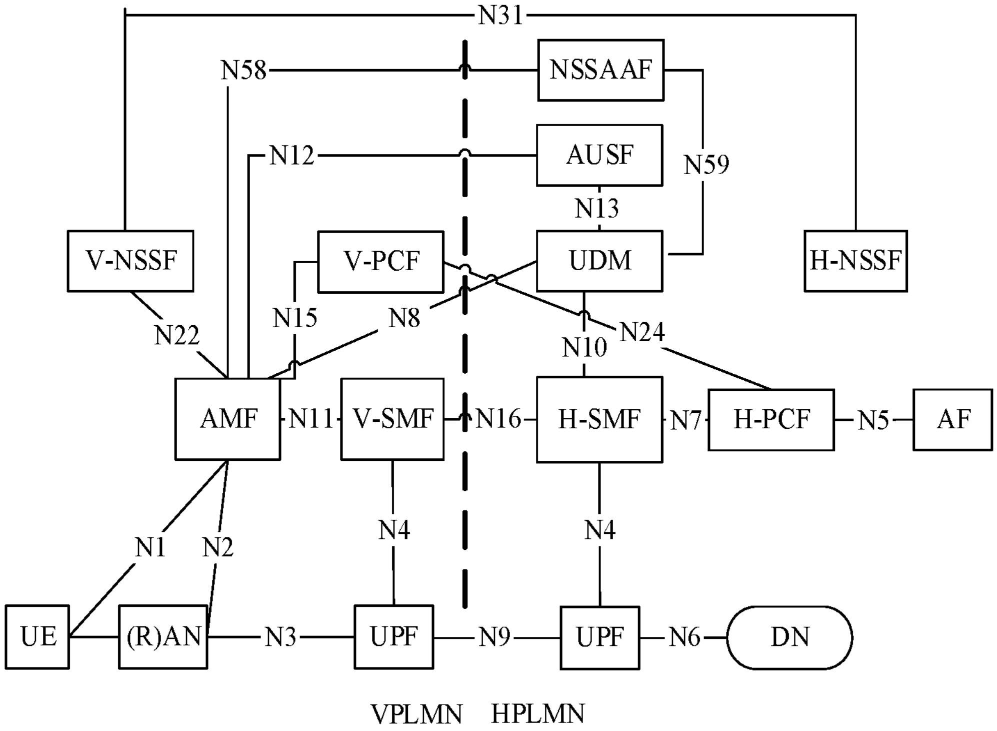
FIG. 1 is a schematic diagram of a network architecture.

In an example, FIG. 1 is a schematic diagram of a network architecture.

As shown in FIG. 1, the network architecture uses home routed (HR) roaming as an example.

A cellular mobile communication network of a standard of an operator may be referred to as a public land mobile network (PLMN). A PLMN signed by user equipment (UE) may be referred to as a home public land mobile network (home PLMN, HPLMN), and represents a home operator of a subscriber. When the UE leaves a coverage area of the HPLMN due to movement or another reason, the UE may access a PLMN if the PLMN meets the following conditions: (1) The PLMN can cover a current location of the UE. (2) An operator of the PLMN and an operator of the HPLMN of the UE sign a roaming protocol (where the roaming protocol indicates a protocol between the operators, content may include, for example, but not limited to, problems such as a service and a charging method provided for a subscriber of a network of a peer operator, and this is not limited). In addition, the PLMN may be referred to as a visited public land mobile network (visited PLMN, VPLMN). When the UE accesses the VPLMN, this may be referred to as roaming. Roaming scenarios may include local breakout (LBO) roaming and home routed (HR) roaming. In the HR roaming scenario, a session management function (SMF) in the VPLMN may forward, to an SMF in the HPLMN, information related to session management (SM). In the HR roaming scenario, the SMF in the HPLMN may receive a subscription permanent identifier (SUPI) of a terminal device from the SMF in the VPLMN. For the HR roaming scenario, refer to specifications in the protocol. This is not limited.

As shown in FIG. 1, the network architecture may include but is not limited to: a network slice specific authentication and authorization function (NSSAAF), a network slice selection function (NSSF), an authentication server function (AUSF), unified data management (UDM), a policy control function (PCF), an application function (AF), an access and mobility management function (AMF), a session management function (SMF), the user equipment (UE), a radio access network device, a user plane function (UPF), a data network (DN), and the like.

The following briefly describes each network element shown in FIG. 1.

1. The UE may be referred to as the terminal device, an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data for a user, for example, a handheld device or a vehicle-mounted device that has a wireless connection function. Currently, some examples of the terminal are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a wearable device, a terminal device in a 5G network, or a terminal device in a future evolved public land mobile network (PLMN). This is not limited in embodiments of this application.

By way of example but not limitation, the terminal device in embodiments of this application may alternatively be a wearable device. The wearable device may also be referred to as a wearable intelligent device, which is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of the user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that dedicated to only one type of application function and need to collaboratively work with other devices such as smartphones, for example, various smart bands or smart jewelry for monitoring physical signs.

In addition, the terminal device in embodiments of this application may alternatively be a terminal device in an IoT system. IoT is an important part of the future development of information technologies. A main technical feature of the IoT is connecting a thing to a network by using a communication technology, to implement an intelligent network for interconnection between a person and a machine or between things.

It should be noted that the terminal device and the access network device may communicate with each other by using an air interface technology (for example, an NR technology or an LTE technology). The terminal devices may also communicate with each other by using an air interface technology (for example, the NR technology or the LTE technology).

In embodiments of this application, an apparatus configured to implement a function of the terminal device may be a terminal device, or may be an apparatus, for example, a chip system or a chip, that can support the terminal device in implementing the function. The apparatus may be installed in the terminal device. In embodiments of this application, the chip system may include a chip, or may include a chip and another discrete component.

2. The radio access network (RAN) device may provide an authorized user in a specific area with a function of accessing a communication network, and may specifically include a wireless network device in a 3rd generation partnership project (3GPP) network, or may include an access point in a non-3GPP network. For ease of description, the radio access network device is represented by using an AN device below.

The AN device may use different radio access technologies. Currently, there are two types of radio access technologies: a 3GPP access technology (for example, a radio access technology used in a 3rd generation (3G) system, a 4th generation (4G) system, or a 5G system) and a non-3GPP access technology. The 3GPP access technology is an access technology that complies with a 3GPP standard specification. For example, an access network device in the 5G system is referred to as a next generation NodeB (gNB) or a RAN device. The non-3GPP access technology may include an air interface technology represented by an access point (AP) in wireless fidelity (Wi-Fi), worldwide interoperability for microwave access (WiMAX), code division multiple access (CDMA), and the like. The AN device may allow interconnection and interworking between the terminal device and a 3GPP core network by using the non-3GPP access technology.

The AN device can be responsible for functions such as radio resource management, quality of service (QoS) management, and data compression and encryption on an air interface side. The AN device provides an access service for the terminal device, and further completes forwarding a control signal and user data between the terminal device and the core network.

The AN device may include, for example, but not limited to, a macro base station, a micro base station (also referred to as a small cell), a radio network controller (RNC), a NodeB (NB), a base station controller (BSC), a base transceiver station (BTS), a home base station (for example, a home evolved NodeB, or a home NodeB, HNB), a baseband unit (BBU), an AP in a Wi-Fi system, a wireless relay node, a wireless backhaul node, a transmission point (TP), or a transmission and reception point (TRP). Alternatively, the AN device may be the gNB or a transmission point (a TRP or a TP) in the 5G (for example, NR) system, or one antenna panel or a group (including a plurality of antenna panels) of antenna panels of a base station in the 5G system. Alternatively, the AN device may be a network node constituting the gNB or a transmission point, for example, a distributed unit (DU), or a base station in a next generation 6G communication system. A specific technology and a specific device form that are used by the AN device are not limited in embodiments of this application.

3. The AMF is mainly configured for functions such as access control, mobility management, and attachment and detachment.

4. The SMF is mainly configured for user plane network element selection, user plane network element redirection, internet protocol (IP) address assignment of the terminal device, and session management in a mobile network, for example, session establishment, modification, and release, and quality of service (QoS) control.

In this application, for differentiation, the SMF in the HPLMN is denoted as a home SMF (H-SMF), and the SMF in the VPLMN is denoted as a visited SMF (V-SMF).

5. The UPF is mainly configured to receive and forward user plane data. For example, the UPF may receive the user plane data from the DN, and send the user plane data to the terminal device by using the AN device. Alternatively, the UPF may receive the user plane data from the terminal device by using the AN device, and forward the user data to the DN. In a session, a UPF that is directly connected to the DN through an N6 interface may be referred to as a protocol data unit (PDU) session anchor (PDU session anchor, PSA).

In this application, for differentiation, a UPF in the HPLMN is denoted as a home UPF (H-UPF), and a UPF in the VPLMN is denoted as a visited UPF (V-UPF). In addition, for differentiation, a PSA in the HPLMN is denoted as a home PSA (H-PSA), and a PSA in the VPLMN is denoted as a visited PSA (V-PSA) (or denoted as a local PSA (L-PSA)).

6. The PCF is mainly configured to: guide a unified policy framework of network behavior, and provide policy rule information and the like for a control plane network element (for example, the AMF or the SMF).

7. The AF is mainly configured to provide a service for a 3GPP network, for example, interact with the PCF to perform policy control.

8. The network slice selection function (NSSF) is mainly configured to select a network slice.

9. The UDM is mainly configured for subscription data management of the UE, including storage and management of a UE identifier, access authorization of the UE, and the like.

10. The DN is mainly an operator network that provides a data service for the UE, for example, an internet, a third-party service network, or an IP multimedia service (IMS) network.

11. The AUSF is mainly configured for user authentication, and the like.

Figure 2:
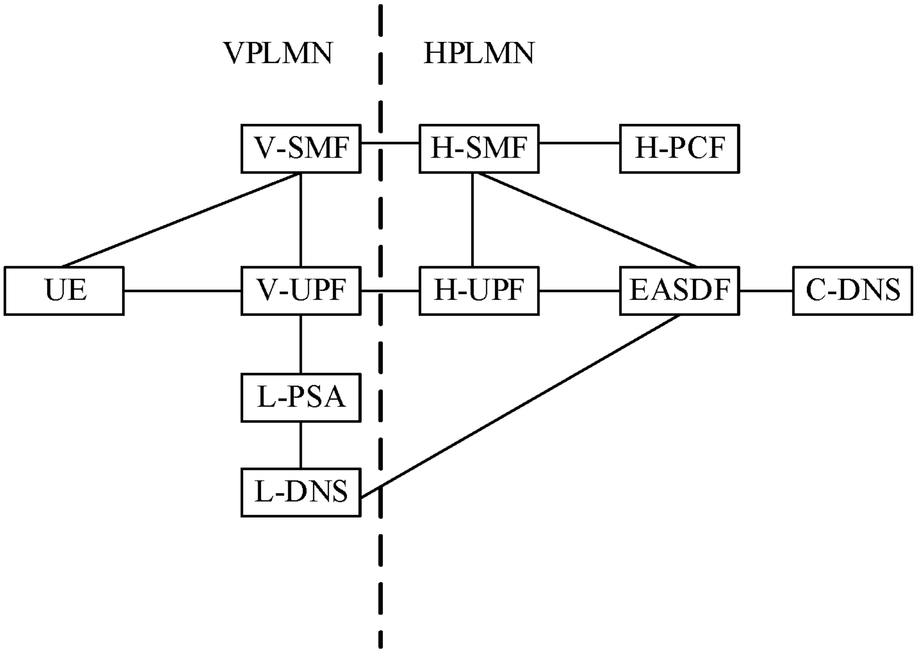
FIG. 2 is a schematic diagram of another network architecture.

In an example, FIG. 2 is a schematic diagram of another network architecture.

As shown in FIG. 2, the network architecture may be understood as an enhancement of the HR roaming architecture shown in FIG. 1. The network architecture may include but not limited to: an SMF (for example, a V-SMF and an H-SMF), UE, a UPF (for example, a V-UPF and an H-UPF), a PSA (for example, an L-PSA), a domain name system (DNS), a PCF (for example, an H-PCF), and an edge application server discovery network element (EASDF). In the architecture, a domain name system (DNS) message may be terminated at an EASDF in an HPLMN. The DNS message may be terminated at the EASDF in the HPLMN. It may indicate that the EASDF in the HPLMN processes the DNS message, may indicate that a destination address of the DNS message is the EASDF in the HPLMN, or may indicate that the EASDF in the HPLMN receives the DNS message. The edge application server discovery network element, for example, may also be referred to as an edge application (service) discovery function, an application instance discovery function, an edge application instance discovery function, or an MEC application (server) discovery function. This is not limited.

The EASDF is mainly configured to assist in discovering an edge application server (EAS), and a main function of the EASDF includes: processing the DNS message based on an indication of the SMF. The processing the DNS message may include but not limited to: reporting the DNS message to the SMF, adding an EDNS-client-subnet option (ECS option) to a DNS query, forwarding the DNS query to a DNS server, forwarding a DNS response to the UE, and the like. An EDNS is extension mechanisms for DNS (EDNS). In this application, for differentiation, a DNS in the HPLMN is denoted as a C-DNS, and a DNS in a VPLMN is denoted as an L-DNS.

For descriptions of other network elements, refer to the descriptions in FIG. 1. Details are not described herein again.

In the network architecture shown in FIG. 1 or FIG. 2, the network elements may communicate with each other through interfaces. For example, the UE is connected to the AN device by using a radio resource control (RRC) protocol, and the UE communicates with the AN device through a Uu interface. Alternatively, for details, refer to interfaces shown in FIG. 1. The details are not described herein again.

It should be understood that the foregoing network architecture is merely an example for description, and a network architecture applicable to embodiments of this application is not limited thereto. Any network architecture that can implement the functions of the foregoing network elements is applicable to embodiments of this application. In addition, the foregoing network architecture may further include more other network elements, for example, a network repository function (NRF) network element. This is not limited. In this application, for differentiation, an NRF in the HPLMN is denoted as a home NRF (H-NRF), and an NRF in the VPLMN is denoted as a visited NRF (V-NRF).

It should be further understood that functions or network elements such as the AMF, the SMF, the UPF, the PCF, the UDM, the NSSF, and the AUSF shown in FIG. 1 or FIG. 2 may be understood as network elements configured to implement different functions, for example, may be combined into a network slice as required. These network elements may be independent devices, may be integrated into a same device to implement different functions, may be network elements in a hardware device, may be software functions running on dedicated hardware, or may be virtualization functions instantiated on a platform (for example, a cloud platform). Specific forms of the foregoing network elements are not limited in this application.

It should be further understood that the foregoing names are defined merely for distinguishing between different functions, and should not constitute any limitation on this application. This application does not exclude a possibility of using other names in a 6G network and another future network. For example, in the 6G network, some or all of the foregoing network elements may still use terms in 5G, or may use other names.

In an edge computing (EC) deployment scenario, some services may be provided by a plurality of EASs deployed at a network edge. The plurality of EASs can provide the same services and content, and most of the EASs have different IP addresses. In the EC scenario, when UE accesses the service, the UE is requested to access an available EAS that is close to the UE. Therefore, it is important to obtain an appropriate IP address of the EAS.

As described above, the UE may access a VPLMN through HR roaming, and the VPLMN provides a service for the UE.

It is considered that, when the UE accesses the VPLMN, EC access may be expected to be used for some services. Currently, for HR roaming UE, in a PDU session establishment phase, only HPLMN-related information (for example, address information of an edge application server discovery network element of an HPLMN) is provided for the UE. A DNS query message sent by the UE cannot reach an edge service discovery network element in the VPLMN. Consequently, an edge application server located in the VPLMN cannot be discovered for the UE. Therefore, an existing edge service discovery mechanism cannot be used in an HR roaming scenario.

This application provides a solution: A session management network element in a VPLMN determines an offloading point, and sends an offloading rule to the offloading point. In this way, roaming UE can access a service in the VPLMN by using the offloading point.

For example, the session management network element in the VPLMN may determine an offloading point in the VPLMN based on information #A, where the information #A indicates that offloading is allowed in the visited network, and the session management network element sends the offloading rule to the offloading point. The offloading point is inserted into the VPLMN, and the offloading rule is provided, so that a packet sent by a terminal device (or a packet corresponding to an access edge service) can be offloaded to the VPLMN by using the offloading point in the VPLMN and the offloading rule, to implement EC access of a local service of the VPLMN in an HR roaming scenario. In addition, the session management network element in the VPLMN determines the offloading point in the VPLMN based on the information #A. Therefore, a requirement of the information #A can be met.

For another example, the session management network element in the VPLMN determines an offloading point in the VPLMN, and sends the offloading rule to the offloading point. The offloading point is inserted into the VPLMN, and the offloading rule is provided, so that a packet sent by a terminal device (or a packet corresponding to an access edge service) can be offloaded to the VPLMN by using the offloading point in the VPLMN and the offloading rule, to implement EC access of a local service of the VPLMN in an HR roaming scenario. In addition, the session management network element in the VPLMN receives information #A, where the information #A indicates whether offloading is allowed in the visited network, and the session management network element may determine, based on the information #A, how to process the offloading point or the offloading rule. In other words, the session management network element in the VPLMN may first determine the offloading point in the visited network, may receive the information #A after determining the offloading point, and may further process the offloading point or the offloading rule based on the information #A, to meet a requirement of the information #A.

Therefore, this application may be used to resolve an edge service discovery problem in a roaming scenario (for example, the HR roaming scenario).

It may be understood that the term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects.

The following describes in detail a communication method provided in embodiments of this application with reference to the accompanying drawings. Embodiments provided in this application may be applied to the network architecture shown in FIG. 1 or FIG. 2. This is not limited.

Figure 3:
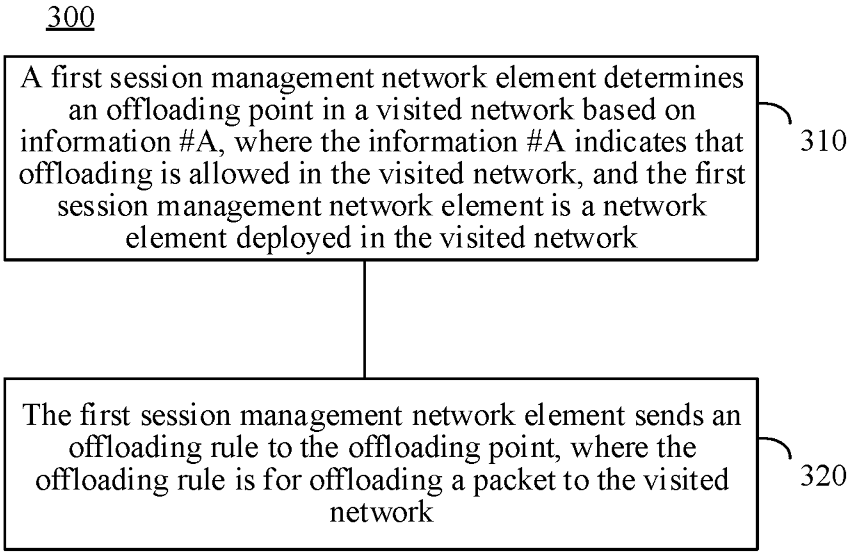
FIG. 3 is a schematic diagram of a communication method according to an embodiment of this application.

FIG. 3 is a schematic diagram of a communication method 300 according to an embodiment of this application. The method 300 may include the following steps.

310: A first session management network element determines an offloading point in a visited network based on information #A, where the information #A indicates that offloading is allowed in the visited network, and the first session management network element is a network element deployed in the visited network.

The visited network is a network accessed by a terminal device after the terminal device leaves a home network. The visited network is, for example, a VPLMN. The following mainly uses the VPLMN as an example for description.

The first session management network element is a network element deployed in the VPLMN. For example, the first session management network element is a V-SMF.

It may be further described as that, the information #A (namely, first information) indicates (or represents) that offloading is allowed, or it may be described as that, the information #A indicates that local offloading is allowed in the VPLMN. Descriptions are provided below for consistency by using an example in which offloading is allowed in the VPLMN.

For example, that offloading is allowed in the VPLMN may indicate that an HPLMN allows local offloading in the VPLMN. Correspondingly, that the information #A indicates that offloading is allowed in the VPLMN may be replaced with that the information #A indicates that the HPLMN allows local offloading in the VPLMN. For another example, that offloading is allowed in the VPLMN may indicate that an offloading point is allowed to be determined in (selected in or inserted into) the VPLMN. Correspondingly, that the information #A indicates that offloading is allowed in the VPLMN may be replaced with that the information #A indicates that the offloading point is allowed to be determined in (selected in or inserted into) the VPLMN. For another example, that offloading is allowed in the VPLMN may indicate that an offloading point is allowed to be determined (selected or inserted). Correspondingly, that the information #A indicates that offloading is allowed in the VPLMN may be replaced with that the information #A indicates that the offloading point is allowed to be determined (selected or inserted).

It may be understood that this application is mainly described by using an example in which offloading is allowed in the VPLMN, and does not limit a situation in which local offloading in the VPLMN needs to be allowed in all cases. In other words, in some cases, offloading may not be allowed (or not be supported) in the VPLMN. In these cases, local offloading may not be performed in the VPLMN.

A specific name of the information #A is not limited in this application. For example, in this application, the "information #A" may be replaced with an "authorization policy", an "offloading policy", or a "roaming policy".

A form of the information #A is not limited in this application. For example, the information #A may be an information element, a parameter, or text content recorded in a protocol. For example, the information #A may be implemented by using one or more bits. For example, it is assumed that one bit indicates whether offloading is allowed in the VPLMN. If the bit is set to "0", it indicates that the information #A indicates that offloading is allowed in the VPLMN. If the bit is set to "1", it indicates that the information #A indicates that offloading is not allowed in the VPLMN.

A solution in which the first session management network element determines the offloading point in the visited network based on the information #A is described in detail below.

The offloading point may be for offloading a packet to the VPLMN, for example, offloading, to the VPLMN, a packet for accessing a service deployed in the VPLMN.

Optionally, the offloading point is an uplink classifier (UL CL) or a branching point (BP). When the terminal device needs to perform service transmission, the terminal device may establish a plurality of PDU sessions to a same DN or different DNs by using an SMF. The SMF may control PDU data routing, so that the PDU sessions can have a plurality of N6 interfaces at the same time. A UPF connected to each N6 interface is referred to as a PSA. Each PSA provides a different path to the same DN. Therefore, in a possible method, the V-SMF may determine the UL CL in the VPLMN. For example, for a PDU session with a different type, the SMF may insert a UL CL into a data transmission path of the PDU session. A function of the UL CL is provided by a UPF, to forward, to a specified path, a data packet that meets a service filtering rule. When a UL CL is inserted into a data channel of a PDU session, the PDU session may have a plurality of PDU session anchors, which provide a plurality of different paths for accessing the same DN. In other words, a function of the UL CL may be transmitting uplink data to different PSAs, and combining downlink data to a UE. In another possible method, the V-SMF may determine the branching point in the VPLMN. Specifically, data corresponding to all PSAs may be aggregated to a common UPF, and the common UPF has a function of the branching point. The branching point forwards uplink data to different PSAs in an uplink direction, and combines downlink data from the PSAs in a downlink direction.

It may be understood that the foregoing is merely an example for description. This is not limited. Any solution that can offload a packet to a VPLMN by using an offloading point is applicable to this embodiment of this application.

320: The first session management network element sends an offloading rule to the offloading point, where the offloading rule is for offloading a packet to the visited network.

The packet may be, for example, a packet for accessing an EAS IP.

The offloading rule is for offloading a service flow to the visited network. In an example, the service flow may be represented by one or more of the following: a destination IP address or prefix, a source IP address or prefix, a destination port number, and a source port number.

In an example, the offloading rule may include two parts of information. One part of information is for detecting (matching or identifying) a service flow, and the other part of information is for forwarding the service flow (for example, offloading the matched service flow to the visited network, or forwarding the matched service flow to a local data network). For example, the offloading rule includes one or more IP addresses. If an IP address in a service flow matches the IP address in the offloading rule, the service flow is offloaded to the visited network.

It should be noted that this application is mainly described by using an example in which the offloading rule is sent by the first session management network element to the offloading point. This application is not limited thereto. For example, the offloading rule may alternatively be locally configured by the offloading point.

Based on the foregoing solution, the first session management network element deployed in the visited network may determine the offloading point based on the information #A, and send the offloading rule to the offloading point. In this way, after accessing the visited network through HR roaming, the terminal device may access a service in the visited network by using the offloading point determined by the first session management network element and the offloading rule sent to the offloading point, to implement local offloading in the visited network. In addition, a packet for accessing an EAS may be further offloaded to the visited network by using the offloading point, so that after accessing the visited network through HR roaming, the terminal device can further access an edge service in the visited network.

Optionally, that a first session management network element determines an offloading point in a visited network based on information #A in step 310 includes at least the following several possible cases.

In a first possible case, the information #A indicates that offloading is allowed in the visited network.

In this case, the first session management network element learns, based on the information #A, that offloading is allowed in the visited network. Therefore, the first session management network element determines the offloading point in the visited network. Alternatively, in this case, the packet, for example, the packet for accessing the EAS IP, may be offloaded to the visited network by using the offloading point.

In a second possible case, the information #A indicates that a first service is allowed to be offloaded in the visited network.

It may be understood that the first service herein represents a service that is allowed to be offloaded in the visited network, and the first service may include one or more types of services. This is not limited.

In this case, the first session management network element learns, based on the information #A, that the first service is allowed to be offloaded in the visited network. Therefore, the first session management network element determines the offloading point in the visited network, and local offloading may be performed on the first service in the visited network by using the offloading point.

Example 1: The Information #A Includes an Identifier of the First Service

In an example, the identifier of the first service may be, for example, any one of the following: a fully qualified domain name (FQDN) (or an FQDN range), an application identifier (application ID, AppID), an IP address, and a port number. In other words, the information #A may include one or more of the following: the FQDN (or the FQDN range), the application identifier, the IP address, and the port number.

The following mainly uses the FQDN as an example for description. It may be understood that the FQDN in the following example may alternatively be replaced with any one of the following: the application identifier, the IP address, and the port number.

For example, the information #A includes one or more FQDNs, and the one or more FQDNs each represent an FQDN corresponding to the service that is allowed to be offloaded in the visited network (that is, the first service corresponds to the FQDN). In a possible implementation, the information #A includes two information elements. One information element indicates that offloading is allowed in the visited network, and the other information element includes the one or more FQDNs. The first session management network element may learn, based on the information #A, that a service corresponding to the one or more FQDNs is allowed to be offloaded in the visited network. In another possible implementation, the information #A includes the one or more FQDNs. The first session management network element determines, based on internal logic, that a service corresponding to the one or more FQDNs is allowed to be offloaded in the visited network.

Example 2: The Information #A Includes an Identifier of a Service (for Example, Denoted as a Second Service) Other than the First Service In an example, the second service may be, for example, any one of the following: an FQDN (or an FQDN range), an application identifier, an IP address, and a port number. In other words, the information #A may include one or more of the following: the FQDN (or the FQDN range), the application identifier, the IP address, and the port number.

The following mainly uses the FQDN as an example for description. It may be understood that the FQDN in the following example may alternatively be replaced with any one of the following: the application identifier, the IP address, and the port number.

For example, the information #A includes one or more FQDNs, and the one or more FQDNs each represent an FQDN corresponding to the service that is not allowed to be offloaded in the visited network (for example, an FQDN corresponding to a second service). In a possible implementation, the information #A includes two information elements. One information element indicates that offloading is not allowed in the visited network, and the other information element includes the one or more FQDNs. The first session management network element may learn, based on the information #A, that a service corresponding to the one or more FQDNs is not allowed to be offloaded in the visited network. In another possible implementation, the information #A includes the one or more FQDNs. The first session management network element determines, based on internal logic, that a service corresponding to the one or more FQDNs is not allowed to be offloaded in the visited network. In addition, further, the first session management network element may learn, based on the information #A, that a service corresponding to another FQDN (namely, an FQDN other than the one or more FQDNs) is allowed to be offloaded in the visited network.

Example 3: The Information #A Includes Identifiers of the First Service and a Second Service The following mainly uses an FQDN as an example for description. It may be understood that the FQDN in the following example may alternatively be replaced with any one of the following: an application identifier, an IP address, and a port number.

For example, the information #A includes one or more FQDNs #1 and one or more FQDNs #2. The one or more FQDNs #1 each represent an FQDN corresponding to the service that is allowed to be offloaded in the visited network, and the one or more FQDNs #2 each represent an FQDN corresponding to a service that is not allowed to be offloaded in the visited network. In a possible implementation, the information #A includes three information elements. One information element indicates that the service corresponding to the FQDN #1 is allowed to be offloaded in the visited network, another information element includes the one or more FQDNs #1, and the remaining information element includes the one or more FQDNs #2. The first session management network element may learn, based on the information #A, that the service corresponding to the one or more FQDNs #1 is allowed to be offloaded in the visited network, and the service corresponding to the one or more FQDNs #2 is not allowed to be offloaded in the visited network. In another possible implementation, the information #A includes three information elements. One information element indicates that the service corresponding to the FQDN #2 is not allowed to be offloaded in the visited network, another information element includes the one or more FQDNs #1, and the remaining information element includes the one or more FQDNs #2. The first session management network element may learn, based on the information #A, that the service corresponding to the one or more FQDNs #1 is allowed to be offloaded in the visited network, and the service corresponding to the one or more FQDNs #2 is not allowed to be offloaded in the visited network. In another possible implementation, the information #A includes two information elements. One information element includes the one or more FQDNs #1, and the other information element includes the one or more FQDNs #2. The first session management network element determines, based on internal logic, that the service corresponding to the one or more FQDNs #1 is allowed to be offloaded in the visited network, and the service corresponding to the one or more FQDNs #2 is not allowed to be offloaded in the visited network.

In a third possible case, the information #A indicates that offloading is not allowed in the visited network.

In this case, if the first session management network element learns, based on the information #A, that offloading is not allowed (or not supported) in the visited network, the first session management network element may not need to determine the offloading point in the visited network, to be specific, not need to determine an offloading point for local offloading in the visited network.

Optionally, the method 300 further includes: The first session management network element obtains the information #A.

The first session management network element may obtain the information #A in at least any one of the following methods.

Method 1: The First Session Management Network Element Receives the Information #A from a Second Session Management Network Element.

For example, the first session management network element is the V-SMF, and the second session management network element is an H-SMF. The H-SMF sends the information #A to the V-SMF. Correspondingly, the V-SMF receives the information #A from the H-SMF.

Method 2: The First Session Management Network Element Locally Configures the Information #A.

For example, a locally configured roaming protocol includes information #A corresponding to the HPLMN, and the first session management network element directly obtains the information #A corresponding to the HPLMN according to the locally configured roaming protocol.

For another example, a locally configured roaming protocol includes one or more pieces of information #A, and the first session management network element obtains the information #A according to the locally configured roaming protocol. The one or more pieces of information #A may be information #A corresponding to one or more PLMNs. The first session management network element may first determine the HPLMN, and then obtain the corresponding information #A based on the HPLMN. For example, the information #A may exist in the first session management network element in a form of Table 1.

TABLE 1

| PLMN identifier (identifier, ID) | Information #A |
|---|---|
| PLMN #1 | Information #A1 |
| PLMN #2 | Information #A2 |
| PLMN #3 | Information #A3 |

Table 1 is used as an example. In a possible case, the PLMN ID may be an ID of the HPLMN, and information #Ai (i=1, 2, 3, . . . ) indicates whether the HPLMN allows local offloading in the VPLMN. For example, if the first session management network element determines that the HPLMN is the PLMN #1, the first session management network element may learn that the information #A corresponding to the HPLMN is the information #AT. If the information #A1 indicates that the PLMN #1 allows local offloading in the VPLMN, the local offloading may be performed in the VPLMN.

A method in which the first session management network element determines the HPLMN is not limited in this application. In an example, the first session management network element may identify the HPLMN based on an identifier of a network element deployed in the HPLMN (for example, an identifier of the second session management network element or an identifier of another network element). In a possible method, the first session management network element receives the identifier of the second session management network element (for example, an H-SMF ID, which is not limited in this application) from an AMF. The first session management network element determines an identifier of the HPLMN based on the identifier of the second session management network element, that is, determines the HPLMN.

It should be understood that Table 1 is merely an example for description. This is not limited. Any variation that belongs to Table 1 is applicable to this application. For example, the PLMN ID in Table 1 may alternatively be replaced with an SMF ID. For example, the PLMN #1 may be replaced with one or more SMF IDs (namely, an ID of one or more SMFs corresponding to the PLMN #1).

The foregoing two methods are examples for description. Any method in which the first session management network element can obtain the information #A is applicable to this embodiment of this application.

Optionally, for a second core network element, the second session management network element may obtain the information #A in at least any one of the following methods.

Method 1: The Second Session Management Network Element Receives the Information #A.

A policy control network element is a network element deployed in the home network. For example, the policy control network element is an H-PCF or an H-NRF.

For example, the second session management network element receives the information #A from the policy control network element, where the policy control network element is the network element deployed in the home network. For example, the second session management network element is an H-SMF, and the policy control network element is the H-PCF. The H-PCF sends the information #A to the H-SMF. Correspondingly, the H-SMF receives the information #A from the H-PCF. A condition for triggering the H-PCF to send the information #A to the H-SMF is not limited. For example, the trigger condition may be that the H-SMF sends an identifier of the VPLMN to the H-PCF.

For another example, the second session management network element receives the information #A from a network repository network element, where the network repository network element is a network element deployed in the home network. For example, the second session management network element is an H-SMF, and the network repository network element is the H-NRF. The H-NRF sends the information #A to the H-SMF. Correspondingly, the H-SMF receives the information #A from the H-NRF. A condition for triggering the H-NRF to send the information #A to the H-SMF is not limited. For example, the trigger condition may be that the H-SMF sends an identifier of the VPLMN to the H-NRF. The following provides examples with reference to FIG. 5 to FIG. 8.

Method 2: The Second Session Management Network Element Locally Configures the Information #A.

For example, a locally configured roaming protocol includes information #A corresponding to the VPLMN, and the second session management network element directly obtains the information #A corresponding to the VPLMN according to the locally configured roaming protocol.

For another example, a locally configured roaming protocol includes one or more pieces of information #A, and the second session management network element obtains the information #A according to the locally configured roaming protocol. The one or more pieces of information #A may be information #A corresponding to one or more PLMNs. The second session management network element may first determine the VPLMN, and then obtain the corresponding information #A based on the VPLMN. It should be noted that the second session management network element may determine the information #A based on a message received from the first session management network element and local configuration. The message may be an Nsmf_PDUSession_Create Request message, an Nsmf_PDUSession_Update Request message, or the like. This is not limited in this application.

The information #A may exist in the second session management network element in a form of Table 2.

TABLE 2

| PLMN ID | Information #A |
|---|---|
| PLMN #1' | Information #A1' |
| PLMN #2' | Information #A2' |
| PLMN #3' | Information #A3' |

Table 2 is used as an example. In a possible case, the PLMN ID may be an ID of the VPLMN, and information #Aj' (j=1, 2, 3, . . . ) indicates whether local offloading is allowed in the VPLMN. For example, if the second session management network element determines that the VPLMN is the PLMN #2, the second session management network element may learn that the information #A corresponding to the VPLMN is the information #A2'. If the information #A2' indicates that local offloading is allowed in the PLMN #2', local offloading may be performed in the VPLMN.

A method in which the second session management network element determines the VPLMN is not limited in this application. In an example, the second session management network element may identify the VPLMN based on an identifier of a network element deployed in the VPLMN (for example, an identifier of the first session management network element or an identifier of another network element). In a possible method, the second session management network element receives the identifier of the first session management network element (for example, a V-SMF ID, which is not limited in this application). The second session management network element determines the identifier of the VPLMN based on the identifier of the first session management network element, that is, determines the VPLMN. In another possible method, the second session management network element receives the identifier of the VPLMN from the first session management network element. In still another possible method, the second session management network element receives a message from the first session management network element, and determines the identifier of the VPLMN based on the message. The message may be an Nsmf_PDUSession_Create Request message, an Nsmf_PDUSession_Update Request message, or the like. This is not limited in this application.

It should be understood that Table 2 is merely an example for description. This is not limited. Any variation that belongs to Table 2 is applicable to this application. For example, the PLMN ID in Table 2 may alternatively be replaced with an SMF ID. For example, the PLMN #1' may be replaced with one or more SMF IDs (namely, an ID of one or more SMFs corresponding to the PLMN #1').

The foregoing two methods are examples for description. Any method in which the second session management network element can obtain the information #A is applicable to this embodiment of this application.

Optionally, the method 300 further includes: The first session management network element determines the offloading rule.

In a first possible implementation, the first session management network element determines the offloading rule based on the information #A.

The information #A may include the identifier of the first service, and the first session management network element determines the offloading rule based on the identifier of the first service in the information #A. The offloading rule may be for offloading a packet of the first service to the visited network.

In an example, the identifier of the first service may be, for example, one or more of the following: an FQDN, an IP address, an application identifier, and a port number. The following mainly uses the FQDN as an example for description. It may be understood that the FQDN in the following example may alternatively be replaced with any one of the following: the application identifier, the IP address, and the port number.

In an example, the information #A includes one or more FQDNs, which are denoted as a target FQDN #1.

Optionally, the first session management network element obtains the target FQDN #1. For example, the first session management network element obtains the information #A, and the information #A includes the target FQDN #1. In a possible implementation, the information #A includes two information elements. One information element indicates whether offloading is allowed in the visited network, and the other information element includes the target FQDN #1. The first session management network element may learn, based on the information #A, whether a service corresponding to the target FQDN #1 is allowed to be offloaded in the visited network. In another possible implementation, the information #A includes the target FQDN #1. The first session management network element determines, based on internal logic, whether a service corresponding to the target FQDN #1 is allowed to be offloaded in the visited network.

The target FQDN #1 includes an FQDN corresponding to the service that is allowed to be offloaded in the visited network, and/or an FQDN corresponding to a service that is not allowed to be offloaded in the visited network. The target FQDN #1 may include one or more FQDNs.

Example 1: The Target FQDN #1 Includes the FQDN Corresponding to the Service that is Allowed to be Offloaded in the Visited Network In the example 1, the information #A in step 310 may indicate that a packet corresponding to the target FQDN #1 is allowed to be offloaded in the visited network, and the packet in step 320 may represent the packet corresponding to the target FQDN #1. In this application, for ease of description, a packet for accessing a service corresponding to an FQDN may be referred to as a packet corresponding to the FQDN. Details are not described again below.

In a possible implementation, the information #A includes two information elements. One information element indicates that offloading is allowed in the visited network, and the other information element includes the target FQDN #1. The first session management network element learns, based on the information #A, that the packet corresponding to the target FQDN #1 is allowed to be offloaded in the visited network. Therefore, the first session management network element may determine the offloading point in the visited network, and the first session management network element may determine an offloading rule based on the target FQDN #1, and send the determined offloading rule to the offloading point. In another possible implementation, the information #A includes the target FQDN #1. The first session management network element learns, based on internal logic, that the packet corresponding to the target FQDN #1 is allowed to be offloaded in the visited network. Therefore, the first session management network element may determine the offloading point in the visited network, and the first session management network element may determine an offloading rule based on the target FQDN #1, and send the determined offloading rule to the offloading point. In any one of the foregoing possible implementations, the offloading rule is for offloading, to the visited network, the packet corresponding to the target FQDN #1. Specifically, according to the offloading rule, when an FQDN of a service matches the target FQDN #1, local offloading is performed on the service in the visited network.

Example 2: The Target FQDN #1 Includes the FQDN Corresponding to the Service that is not Allowed to be Offloaded in the Visited Network In the example 2, the information #A in step 310 may indicate that a packet corresponding to an FQDN other than the target FQDN #1 is allowed to be offloaded in the visited network, or the information #A in step 310 may indicate that a packet corresponding to the target FQDN #1 is not allowed to be offloaded in the visited network. The packet in step 320 may represent the packet corresponding to the FQDN other than the target FQDN #1.

In a possible implementation, the information #A includes two information elements. One information element indicates that offloading is not allowed in the visited network, and the other information element includes the target FQDN #1. The first session management network element learns, based on the information #A, that the packet corresponding to the FQDN other than the target FQDN #1 is allowed to be offloaded in the visited network, or the first session management network element learns, based on the information #A, that the packet corresponding to the target FQDN #1 is not allowed to be offloaded in the visited network. Therefore, the first session management network element may determine the offloading point in the visited network, and the first session management network element may determine an offloading rule based on the target FQDN #1, and send the determined offloading rule to the offloading point. In another possible implementation, the information #A includes the target FQDN #1. The first session management network element learns, based on internal logic, that the packet corresponding to the FQDN other than the target FQDN #1 is allowed to be offloaded in the visited network, or the first session management network element learns, based on internal logic, that the packet corresponding to the target FQDN #1 is not allowed to be offloaded in the visited network. Therefore, the first session management network element may determine the offloading point in the visited network, and the first session management network element may determine an offloading rule based on the target FQDN #1, and send the determined offloading rule to the offloading point. In any one of the foregoing possible implementations, the offloading rule is for offloading, to the visited network, the packet corresponding to the FQDN other than the target FQDN #1. Specifically, according to the offloading rule, when an FQDN of a service matches the FQDN other than the target FQDN #1, or when an FQDN of a service does not match the target FQDN #1, local offloading is performed on the service in the visited network.

It may be understood that the foregoing two examples are merely examples for description. This application is not limited thereto. For example, the target FQDN #1 may include the FQDN corresponding to the service that is allowed to be offloaded in the visited network and the FQDN corresponding to the service that is not allowed to be offloaded in the visited network.

It may be further understood that, in descriptions of the first possible implementation, the FQDN is mainly used as an example for description. This application is not limited thereto. For example, the FQDN may be replaced with any one or more of the IP address and the AppID.

In a second possible implementation, the first session management network element determines the offloading rule based on configuration information.

In an example, the configuration information may be EAS deployment information, locally configured policy information, or address information (for example, an EAS IP address) determined for the UE when the UE accesses a service in the VPLMN.

The EAS deployment information includes deployment information about an EAS in an edge network, for example, may include but not limited to: an FQDN corresponding to a service, and EAS IP address information. A first core network element may locally configure the EAS deployment information, or may receive the EAS deployment information from an AF. This is not limited.

The following mainly uses the EAS deployment information as an example for description.

The first session management network element may determine an offloading rule based on the EAS deployment information, and send the determined offloading rule to the offloading point.

It is assumed that the EAS deployment information includes an FQDN range corresponding to a service deployed in the VPLMN, where the FQDN range is denoted as a target FQDN #2, or an IP range corresponding to the service deployed in the VPLMN, where the IP range is denoted as a target IP #2.

For example, the determined offloading rule is that a packet corresponding to the target FQDN #2 is offloaded to the visited network. Specifically, according to the offloading rule, when an FQDN of a service accessed by using a packet matches the FQDN range (namely, the target FQDN #2) corresponding to the offloading rule, local offloading is performed on the service in the visited network. For another example, the determined offloading rule is that a packet corresponding to the target IP #2 is offloaded to the visited network. Specifically, according to the offloading rule, when a destination IP of a packet matches the IP range (namely, the target IP #2) corresponding to the offloading rule, local offloading is performed on the packet in the visited network.

It may be understood that an address for determining the offloading rule may alternatively be an EAS IP address determined when the UE accesses the service in the VPLMN, for example, an EAS IP address obtained by the first session management network element from another network element. The EAS IP address may be determined for the UE. The IP address may be an IP address received from the second session management network element. For example, an EASDF sends a DNS request message to a DNS server, and receives a DNS response message from the DNS server. The DNS response message includes the IP address. After receiving the DNS response message, the EASDF sends, to the second session management network element, the IP address included in the DNS response message. After receiving the IP address, the second session management network element sends the IP address to the first session management network element. It may be understood that no limitation is imposed on this.

In a third possible implementation, the first session management network element determines the offloading rule based on configuration information and the information #A.

The following mainly uses EAS deployment information as an example for description.

The first session management network element may determine an offloading rule based on the EAS deployment information and the information #A, and send the determined offloading rule to the offloading point.

It is assumed that the EAS deployment information includes an FQDN range corresponding to a service deployed in the VPLMN, where the FQDN range is denoted as a target FQDN #2, or an IP range corresponding to the service deployed in the VPLMN, where the IP range is denoted as a target IP #2. The information #A includes an FQDN range (for example, a target FQDN #1) corresponding to a service that is allowed to be offloaded in the VPLMN, or an IP range (for example, a target IP #1) corresponding to the service that is allowed to be offloaded in the VPLMN.

For example, the determined offloading rule is that a packet corresponding to an FQDN (for example, denoted as a target FQDN #3) in an intersection part of the target FQDN #1 and the target FQDN #2 is offloaded to the visited network. Specifically, according to the offloading rule, when an FQDN of a service accessed by using a packet matches an FQDN range (namely, the target FQDN #3) corresponding to the offloading rule, local offloading is performed on the service in the visited network.

For another example, the determined offloading rule is that a packet corresponding to an IP (for example, denoted as a target IP #3) in an intersection part of the target IP #1 and the target IP #2 is offloaded to the visited network. Specifically, according to the offloading rule, when a destination IP of a packet matches an IP range (namely, the target IP #3) corresponding to the offloading rule, local offloading is performed on the service in the visited network.

For another example, the first session management network element determines, based on local configuration, that an IP address range corresponding to a target FQDN #3 is a target IP #3, and the determined offloading rule is that a packet corresponding to the target IP #3 is offloaded to the visited network. Specifically, according to the offloading rule, when a destination IP of a packet matches an IP range (namely, the target IP #3) corresponding to the offloading rule, local offloading is performed on the service in the visited network.

Figure 4:
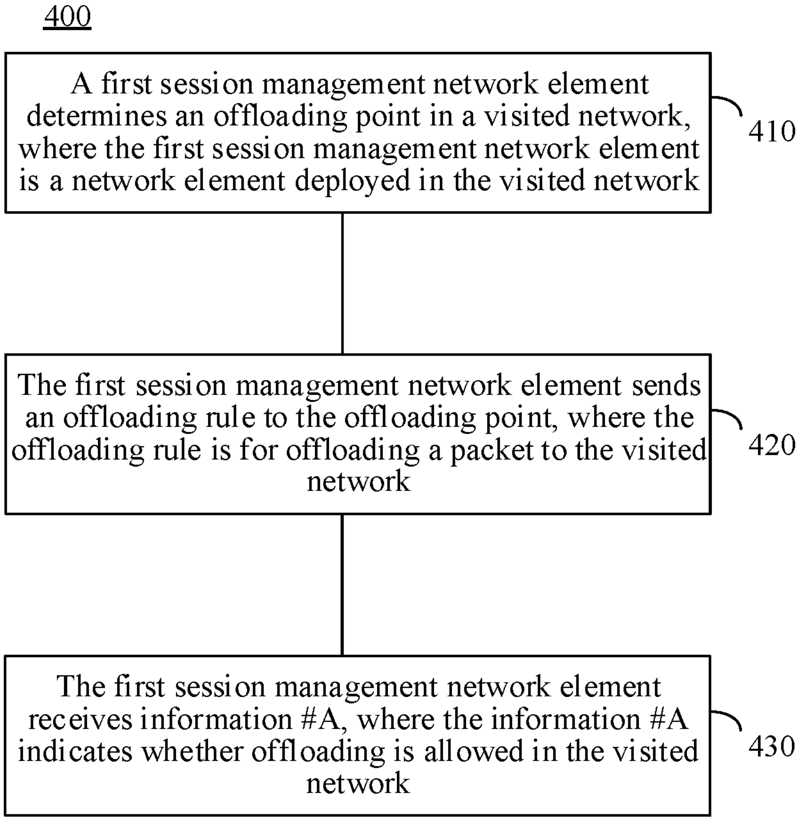
FIG. 4 is a schematic diagram of another communication method according to an embodiment of this application.

FIG. 4 is a schematic diagram of another communication method 400 according to an embodiment of this application. The method 400 may include the following steps.

410: A first session management network element determines an offloading point in a visited network, where the first session management network element is a network element deployed in the visited network.

The first session management network element is a network element deployed in a VPLMN. For example, the first session management network element is a V-SMF.

For the offloading point, refer to descriptions in the foregoing method 300. Details are not described herein again.

Optionally, the first session management network element may determine the offloading point in the visited network based on local configuration, in a method of obtaining the offloading point from an NRF network element, or in another method. In an example, after receiving a session establishment request message, the first session management network element determines the offloading point based on local configuration information.

It should be noted that the offloading point and a V-UPF serving a current session may be the same network element, or may be different network elements. This is not limited. In an example, when an HR session is established, the V-UPF is a V-UPF selected by the V-SMF to serve the session. For the V-UPF, details are not described below.

The session establishment request message may be, for example, an Nsmf interface PDU session establishment session context request (Nsmf_PDUSession_CreateSMContext Request) message sent by an AMF to the first session management network element. This is not limited in this application.

420: The first session management network element sends an offloading rule to the offloading point, where the offloading rule is for offloading a packet to the visited network.

430: The first session management network element receives information #A, where the information #A represents whether offloading is allowed in the visited network.

In a possible implementation, the first session management network element receives the information #A from a second session management network element.

It may be further described as that, the information #A represents (indicates or indicates) whether offloading is allowed. For descriptions of the information #A, refer to related descriptions in the method 300. Details are not described herein again.

Based on the foregoing solution, the first session management network element deployed in the visited network may determine the offloading point, and send the offloading rule to the offloading point. In this way, after accessing the visited network through HR roaming, a terminal device may access a service in the visited network by using the offloading point determined by the first session management network element, to implement local offloading in the visited network. In addition, a packet for accessing an EAS may be further offloaded to the visited network by using the offloading point, so that after accessing the visited network through HR roaming, the terminal device can further access an edge service in the visited network. In addition, the first session management network element may determine, based on the information #A, how to process the offloading point or the offloading rule. In other words, the first session management network element may first determine the offloading point in the visited network, may receive the information #A after determining the offloading point, and may further process the offloading point or the offloading rule based on the information #A, to meet a requirement of the information #A.

Optionally, the method 400 further includes: The first session management network element may determine the offloading rule.

In a possible implementation, the first session management network element determines the offloading rule based on the configuration information. For details, refer to related descriptions of the second possible implementation in which "the first session management network element determines the offloading rule" in the method 300. The details are not described herein again.

In another possible implementation, the first session management network element may determine the offloading rule based on locally configured information #A. For details, refer to related descriptions of the first possible implementation in which "the first session management network element determines the offloading rule" in the method 300. The details are not described herein again.

Optionally, in step 430, the first session management network element processes the offloading point or the offloading rule based on the information #A. For example, the first session management network element deletes or updates the offloading rule based on the information #A. Optionally, the first session management network element may further delete or update the offloading point based on the information #A. The following describes several possible cases with reference to the information #A.

It should be noted that the foregoing mainly uses processing of the offloading point and processing of the offloading rule as an example for description. It may be understood that, this application is not limited to processing of only the offloading point or processing of only the offloading rule. For example, the first session management network element may alternatively process the offloading point and the offloading rule based on the information #A. In other words, processing objects may be the offloading point and the offloading rule. For example, for any one of a case of processing the offloading point, a case of processing the offloading rule, and a case of processing the offloading point and the offloading rule, a specific processing method may include any one or more of deleting, updating, replacing, and sending, or may be no action. It should be noted that, when the first session management network element processes the offloading point and the offloading rule, methods of processing the offloading point and processing the offloading rule are not limited to be necessarily the same. For example, if the first session management network element processes the offloading point and the offloading rule, the first session management network element may perform different actions in the foregoing processing on the offloading point and the offloading rule, for example, update the offloading point and send the offloading rule; update the offloading point and delete the offloading rule; or delete the offloading rule and perform no action on the offloading point.

In a first possible case, the information #A indicates that offloading is allowed in the visited network.

In this case, in an example, the first session management network element may not need to delete or update the offloading rule, or may not need to delete or update the offloading point. In other words, the offloading point in step 410 and the offloading rule in step 420 continue to be used.

It should be noted that, in this case, the first session management network element may alternatively update or delete the offloading rule, and/or the first session management network element may alternatively update or delete the offloading point.

In a second possible case, the information #A indicates that offloading is not allowed in the visited network.

In this case, in an example, the first session management network element may delete the offloading rule. Optionally, the first session management network element may delete the offloading point.

For example, when the offloading point is different from the V-UPF (namely, the V-UPF serving the current session), the first session management network element may delete the offloading point. It may be understood that deleting the offloading point refers to deleting the offloading rule of the offloading point. For example, deleting the offloading point may be understood as selecting the V-UPF serving the current session without using the offloading point.

For another example, when the offloading point is the same as the V-UPF (namely, the V-UPF serving the current session), the first session management network element may delete the offloading rule, and does not delete the offloading point.

In a third possible case, the information #A indicates that a first service is allowed to be offloaded in the visited network.

In this case, in an example, the first session management network element updates the offloading point or the offloading rule based on the information #A.

(1) The First Session Management Network Element Updates the Offloading Rule.

Example 1: The Information #a Includes an Identifier of the First Service

For example, in step 430, the information #A received by the first session management network element includes the identifier of the first service, and the information #A indicates that the first service is allowed to be offloaded in the visited network. The first session management network element updates the offloading rule based on the first service. Optionally, the first session management network element sends an updated offloading rule to the offloading point. Updating the offloading rule may include determining the updated offloading rule based on the first service in the information #A, and the updated offloading rule is for offloading, to the visited network, a packet corresponding to the first service.

In an example, the identifier of the first service may be, for example, any one of the following: an FQDN (or an FQDN range), an application identifier, an IP address, and a port number. In other words, the information #A may include one or more of the following: the FQDN (or the FQDN range), the application identifier, the IP address, and the port number.

The following mainly uses the FQDN as an example for description. It may be understood that the FQDN in the following example may alternatively be replaced with any one of the following: the application identifier, the IP address, and the port number.

For example, the information #A includes one or more FQDNs, which are denoted as a target FQDN #4. The information #A in step 430 may indicate that a packet corresponding to the target FQDN #4 is allowed to be offloaded in the visited network. Further, the first session management network element may update the offloading rule based on the target FQDN #4 (or it may be understood as that the first session management network element re-determines an offloading rule based on the target FQDN #4).

In a possible implementation, the information #A includes two information elements. One information element indicates that offloading is allowed in the visited network, and the other information element includes the target FQDN #4. The first session management network element learns, based on the information #A, that the packet corresponding to the target FQDN #4 is allowed to be offloaded in the visited network. In another possible implementation, the information #A includes the target FQDN #4. The first session management network element determines, based on internal logic, that a service corresponding to the target FQDN #4 is allowed to be offloaded in the visited network. In any one of the foregoing possible implementations, the first session management network element may update the offloading rule based on the target FQDN #4 (or it may be understood as that the first session management network element re-determines an offloading rule based on the target FQDN #4), and send an updated offloading rule to the offloading point. The updated offloading rule is for offloading, to the visited network, the packet corresponding to the target FQDN #4. Specifically, according to the offloading rule, when an FQDN of a service matches the target FQDN #4, local offloading is performed on the service in the visited network.

Example 2: The Information #A Includes an Identifier of a Second Service

For example, in step 430, the information #A received by the first session management network element includes the identifier of the second service, and the information #A indicates that the second service is not allowed to be offloaded in the visited network, or it may be understood as that a service other than the second service is allowed to be offloaded in the visited network. The first session management network element updates the offloading rule based on the second service. Optionally, the first session management network element sends an updated offloading rule to the offloading point. Updating the offloading rule may include determining the updated offloading rule based on the second service in the information #A, and the updated offloading rule is for offloading, to the visited network, a packet corresponding to the service other than the second service.

In an example, the identifier of the second service may be, for example, any one of the following: an FQDN (or an FQDN range), an application identifier, an IP address, and a port number. In other words, the information #A may include one or more of the following: the FQDN (or the FQDN range), the application identifier, the IP address, and the port number.

The following mainly uses the FQDN as an example for description. It may be understood that the FQDN in the following example may alternatively be replaced with any one of the following: the application identifier, the IP address, and the port number.

For example, the information #A includes one or more FQDNs, which are denoted as a target FQDN #5. The information #A in step 430 may indicate that a packet corresponding to an FQDN other than the target FQDN #5 is allowed to be offloaded in the visited network; or the information #A in step 430 may indicate that a packet corresponding to the target FQDN #5 is not allowed to be offloaded in the visited network.

In a possible implementation, the information #A includes two information elements. One information element indicates that offloading is not allowed in the visited network, and the other information element includes the target FQDN #5. The first session management network element learns, based on the information #A, that the packet corresponding to the FQDN other than the target FQDN #5 is allowed to be offloaded in the visited network. In another possible implementation, the information #A includes the target FQDN #5. The first session management network element determines, based on internal logic, that a service corresponding to the target FQDN #5 is not allowed to be offloaded in the visited network. In any one of the foregoing possible implementations, the first session management network element may update the offloading rule based on the target FQDN #5 (or it may be understood as that the first session management network element re-determines an offloading rule based on the target FQDN #5), and send an updated offloading rule to the offloading point. The updated offloading rule is for offloading, to the visited network, the packet corresponding to the FQDN other than the target FQDN #5. Specifically, according to the updated offloading rule, when an FQDN of a service matches the FQDN other than the target FQDN #5, or when an FQDN of a service does not match the target FQDN #5, local offloading is performed on the service in the visited network.

It may be understood that the foregoing two examples are merely examples for description. This application is not limited thereto. For example, the information #A includes the identifiers of the first service and the second service.

(2) The First Session Management Network Element Updates the Offloading Point.

Optionally, the information #A includes the identifier of the first service. For the identifier of the first service, refer to the foregoing descriptions. Herein, the FQDN is mainly used as an example for description.

For example, in step 430, the information #A received by the first session management network element includes the identifier of the first service, and the information #A indicates that the first service is allowed to be offloaded in the visited network. The first session management network element updates the offloading point based on the identifier of the first service; and the first session management network element may send the offloading rule to an updated offloading point. Updating the offloading point may include determining a new offloading point based on the first service in the information #A, and the offloading rule is for offloading, to the visited network by using the new offloading point, the packet corresponding to the first service.

The first session management network element updates the offloading point. In other words, the first session management network element re-selects an offloading point. A possible reason for triggering the first session management network element to update the offloading point is as follows: For example, the information #A includes one or more FQDNs that are allowed to be offloaded in the visited network, and for services corresponding to the one or more FQDNs, a UPF with a closer deployment location exists. In this case, the first session management network element may select the UPF as the offloading point. It should be noted that, if the offloading point is re-selected, the first session management network element sends the offloading rule to a new offloading point, and may delete the offloading rule of the old offloading point.

It may be understood that the foregoing several cases are merely examples for description. This is not limited. A solution in which the first session management network element processes the offloading point or the offloading rule based on the information #A after determining the offloading point in the visited network is applicable to this embodiment of this application.

Optionally, after the first session management network element deletes the offloading point or updates the offloading point based on the information #A, the method 400 further includes: The first session management network element sends updated tunnel information to the second session management network element. The second session management network element is a network element deployed in a home network. For example, the second session management network element is an H-SMF.

It should be noted that, when the offloading point selected in step 410 is different from the V-UPF serving the current session, and the offloading point is deleted or the offloading point is updated, an action of sending, by the first session management network element, the updated tunnel information to the second session management network element is performed.

For example, if the first session management network element deletes the offloading point, the first session management network element determines, based on the information #A, to send the updated tunnel information to the second session management network element, so that the first session management network element sends the updated tunnel information to the second session management network element based on the information #A. The tunnel information may include, for example, information about an updated offloading point, or may include information about an original V-UPF.

For example, if the first session management network element updates the offloading point, the first session management network element sends information about an updated offloading point to the second session management network element. For example, the information may include an address of the updated offloading point, or may include an identifier of the updated offloading point.

For another example, if the first session management network element deletes the offloading point, and the offloading point is different from an original V-UPF of an HR session, the first session management network element sends information about the original V-UPF of the session (namely, the HR session) to the second session management network element. For example, the information may include an address of the original V-UPF, or may include an identifier of the original V-UPF.

For ease of understanding, the following uses examples to describe embodiments of this application with reference to FIG. 5 to FIG. 8. In the following examples, it is assumed that a first session management network element is a V-SMF, a second session management network element is an H-SMF, a policy control network element is an H-PCF, and information #A is an authorization policy. For details about related steps, refer to the foregoing descriptions.

Figure 5:
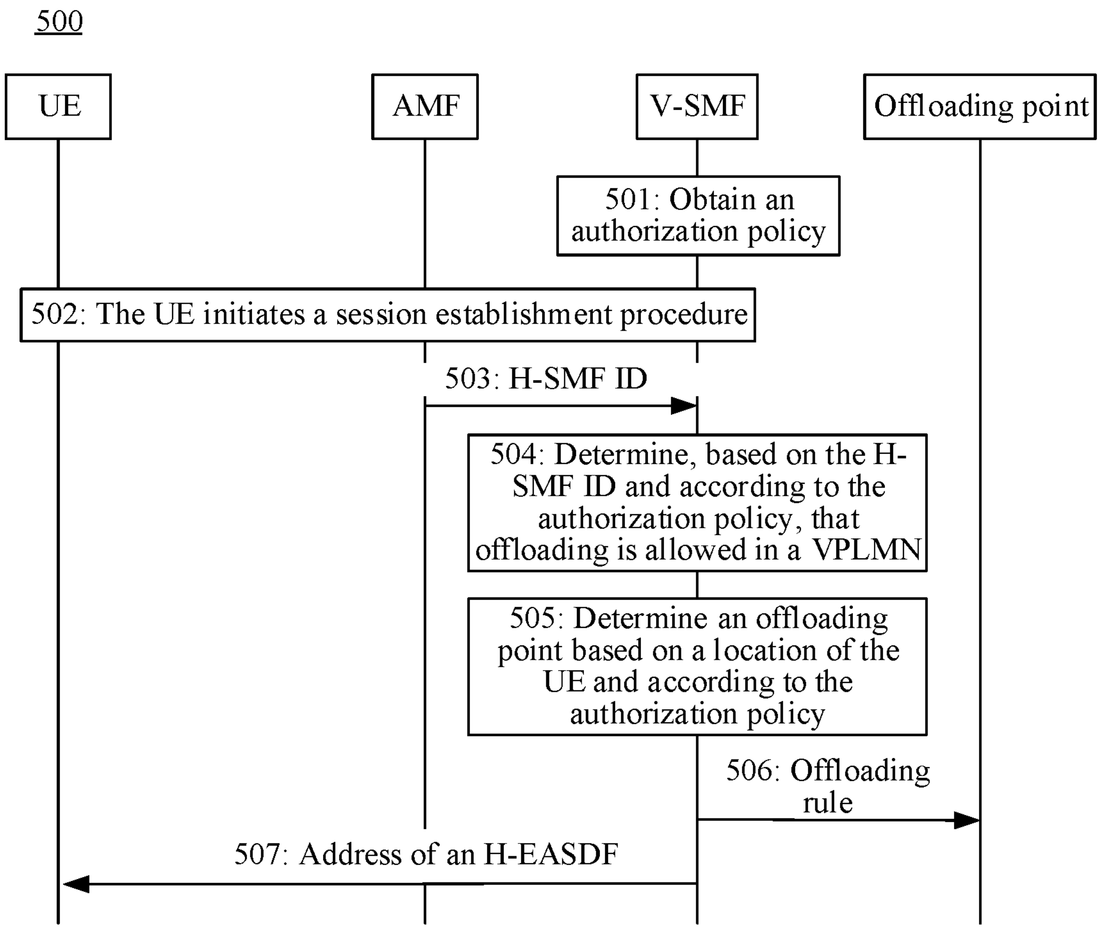
FIG. 5 is a schematic flowchart of a communication method according to an embodiment of this application.

FIG. 5 is a schematic flowchart of a communication method 500 according to an embodiment of this application. The method 500 may be used to implement the solution as shown in the method 300. For example, the method 500 may be used in a scenario in which a V-SMF inserts an offloading point according to an authorization policy (namely, information #A). The method 500 may include the following steps.

501: The V-SMF obtains the authorization policy.

The authorization policy indicates (or represents) whether offloading is allowed in a VPLMN (or the authorization policy indicates (or represents) whether offloading is allowed). The method 500 is mainly described by using an example in which the authorization policy indicates that offloading is allowed in the VPLMN. For the authorization policy, refer to descriptions about the information #A in the foregoing method 300. Details are not described herein again.

The V-SMF may obtain the authorization policy in at least any one of the following methods.

In a first possible method, the V-SMF locally configures the authorization policy. For example, a configuration structure of the authorization policy in the V-SMF is in a form of a {PLMN ID—authorization policy} set, as shown in the foregoing Table 1.

In a second possible method, the V-SMF receives the authorization policy. For example, the V-SMF receives the authorization policy from an H-SMF.

For a specific method in which the V-SMF obtains the authorization policy, refer to the method in which the first session management network element obtains the information #A in the method 300. Details are not described herein again.

Optionally, the authorization policy includes a target FQDN #1 (or an FQDN range), and the target FQDN #1 may include one or more FQDNs. The target FQDN #1 includes an FQDN corresponding to a service that is allowed to be offloaded in the VPLMN, and/or an FQDN corresponding to a service that is not allowed to be offloaded in the VPLMN. For example, the target FQDN #1 includes the FQDN corresponding to the service that is allowed to be offloaded in the VPLMN. Specifically, when an FQDN of a service matches the target FQDN #1, the service is allowed to be offloaded in the VPLMN.

502: UE initiates a session establishment procedure.

In an HR roaming scenario, the UE may initiate an HR session establishment procedure. A specific session establishment procedure is not limited in this application. For example, the following method may be used: After receiving a session establishment request of the UE, an AMF selects a V-SMF and an H-SMF that serve an HR session; and after receiving the session establishment request, the V-SMF and the H-SMF respectively select a V-UPF and an H-UPF that serve the HR session, create an N4 session, and send user plane tunnel information. If the session is successfully established, a network side returns a session establishment response to the UE, and then transmits a packet by using the HR session.

For details, refer to chapters such as 4.3.2.2.2 in the 3GPP standard TS 23.502, or a subsequent session establishment method. This is not limited in this application.

It should be understood that step 502 is not limited to performing the complete HR session establishment procedure. A plurality of steps after step 502 may reuse the HR session establishment procedure; or a plurality of steps after step 502 may be performed in the HR session establishment procedure.

503: The AMF sends an H-SMF ID to the V-SMF.

In a possible case, the configuration structure of the authorization policy in the V-SMF is in the form of the {PLMN ID—authorization policy} set. In this case, the AMF may send the H-SMF ID to the V-SMF, so that the V-SMF can determine an HPLMN ID based on the H-SMF ID, that is, determine an HPLMN.

In a possible implementation, the HR session establishment procedure is reused. The AMF sends an Nsmf interface PDU session establishment session management context request (Nsmf_PDUSession_CreateSMContext Request) message to the V-SMF, where the message carries the H-SMF ID.

It should be understood that the Nsmf_PDUSession_CreateSMContext Request message is merely an example for description. This is not limited.

504: The V-SMF determines, based on the H-SMF ID and according to the authorization policy, that offloading is allowed to be performed in the VPLMN.

For example, it is assumed that in step 501, the configuration structure of the authorization policy in the V-SMF is in the form of the {PLMN ID—authorization policy} set, as shown in Table 1. The V-SMF may determine the HPLMN ID based on the H-SMF ID received in step 503, and further obtain, based on Table 1, an authorization policy corresponding to the HPLMN.

Table 1 is used as an example. If the V-SMF determines, based on the H-SMF ID, that the HPLMN is the PLMN #1, the V-SMF may learn that information #A (namely, the authorization policy) corresponding to the HPLMN is the information #A1. In the method 500, it is assumed that the information #A1 indicates that the PLMN #1 allows offloading in the VPLMN.

505: The V-SMF determines the offloading point based on a location of the UE and according to the authorization policy.

In other words, in step 310 in the method 300, that a first session management network element determines an offloading point in a visited network may include: The first session management network element determines the offloading point based on the location of the UE and according to the authorization policy. For example, if the authorization policy indicates that offloading is allowed in the VPLMN, the V-SMF may insert the offloading point based on the location of the UE. It may be understood that if the authorization policy indicates that offloading is not allowed in the VPLMN, the V-SMF may not need to insert the offloading point.

The offloading point may include, for example, a UL CL or a BP. Alternatively, the offloading point may further include an L-PSA. The UL CL may be the same as or different from the V-UPF serving the HR session. This is not limited.

506: The V-SMF sends an offloading rule to the offloading point.

The V-SMF may determine the offloading rule, and send the offloading rule to the offloading point. The offloading rule includes an IP range, and is for offloading, to the L-PSA, a packet for accessing the IP range.

In a possible implementation, the V-SMF determines an offloading rule based on locally configured EAS deployment information.

In another possible implementation, if the authorization policy in step 501 includes the target FQDN #1, the V-SMF may determine an offloading rule based on the target FQDN #1.

For the foregoing two methods, refer to descriptions in the method 300. Details are not described herein again.

The V-SMF may send the offloading rule to the offloading point by using, for example, an N4 session modification request or an N4 session establishment request.

The UL CL is used as an example. In a first possible case, the UL CL is the same as the V-UPF serving the HR session. In this case, that the V-SMF sends the offloading rule to the UL CL may include: The V-SMF sends an N4 session modification request message to the UL CL, where the N4 session modification request message includes the offloading rule. Correspondingly, the UL CL may send an N4 session modification response message to the V-SMF.

In a second possible case, the UL CL is different from the V-UPF serving the HR session. In this case, that the V-SMF sends the offloading rule to the UL CL may include: The V-SMF sends an N4 session establishment request message to the UL CL, where the N4 session establishment request message includes the offloading rule. Correspondingly, the UL CL may send an N4 session establishment response message to the V-SMF.

507: The V-SMF sends an address of an H-EASDF to the UE.

In a possible implementation, the V-SMF sends the address of a V-EASDF to the UE by using the AMF. For example, the V-SMF sends an N1 message to the UE by using the AMF, where the N1 message includes an N1 SM container, and the N1 SM container carries the address of the H-EASDF. For example, the V-SMF sends the address of the H-EASDF to the AMF by using an Namf_Communication_N1N2MessageTransfer message, and then the AMF sends the address of the H-EASDF to the UE by using a non-access stratum (NAS) message. The UE and the AMF may interact with each other through an N1 interface, and an interaction message may be, for example, referred to as a NAS message.

Based on the method 500, when learning, according to the authorization policy, that offloading is allowed to be performed in the VPLMN, the V-SMF determines the offloading point, and sends the offloading rule to the offloading point, to implement local offloading in the VPLMN in the HR roaming scenario.

Figure 6:
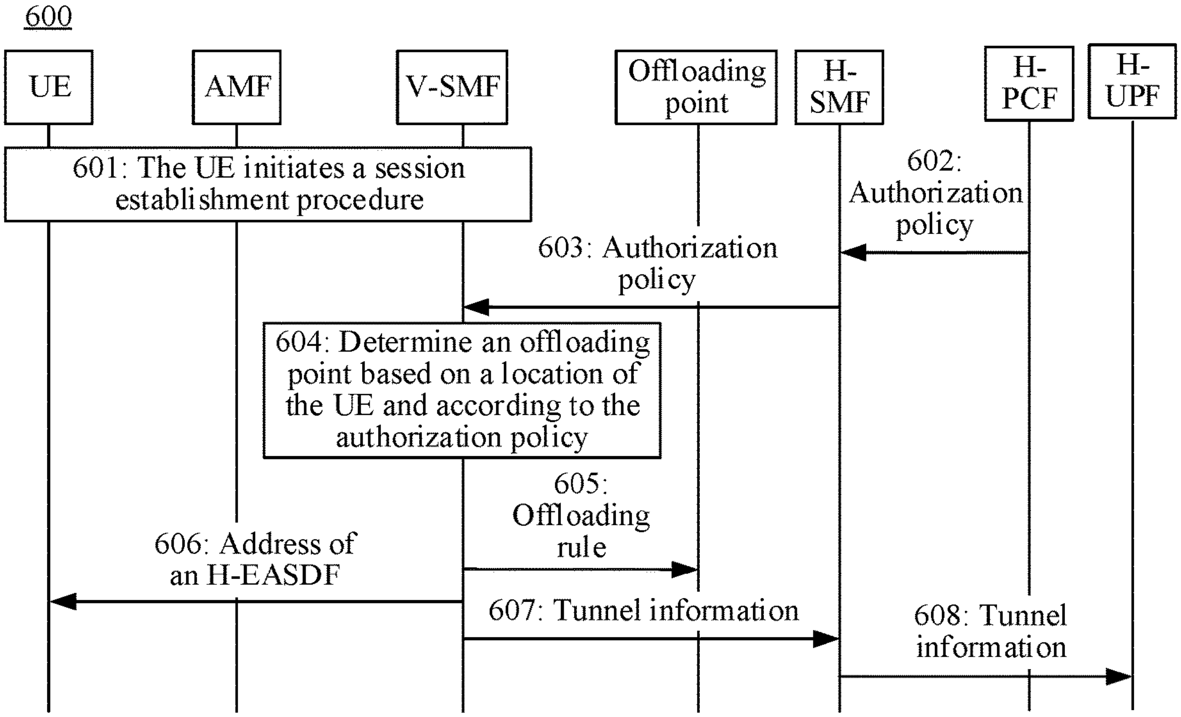
FIG. 6 is a schematic flowchart of another communication method according to an embodiment of this application.

FIG. 6 is a schematic flowchart of another communication method 600 according to an embodiment of this application. The method 600 may be used to implement the solution as shown the method 300. For example, the method 600 may be used in a scenario in which a V-SMF inserts an offloading point according to an authorization policy (namely, information #A) obtained from an HPLMN. The method 600 may include the following steps.

601: UE initiates a session establishment procedure.

Step 601 is similar to step 502. Details are not described herein again.

602: An H-PCF sends the authorization policy to an H-SMF.

The authorization policy indicates (or represents) whether offloading is allowed in a VPLMN (or the authorization policy indicates whether offloading is allowed). The method 600 is mainly described by using an example in which the authorization policy indicates (or represents) that offloading is allowed in the VPLMN. For the authorization policy, refer to descriptions about the information #A in the foregoing method 300. Details are not described herein again.

In a possible implementation, an HR session establishment procedure is reused, and is implemented by using a session management (SM) policy. For example, a PDU session may be established or modified by using SM signaling. In a procedure of establishing or modifying the PDU session by using the SM signaling, the H-PCF sends the authorization policy to the H-SMF.

Specifically, in a possible implementation, after receiving an Nsmf_PDUSession_Create Request message from the V-SMF, the H-SMF triggers H-PCF selection. After the H-PCF selection is complete, an SM policy association establishment procedure or an SM policy association modification procedure is triggered. In the SM policy association establishment procedure, the H-SMF sends an Npcf interface SM policy control establishment request (Npcf_SMPolicyControl_Create Request) message to the H-PCF. The message may include one or more of the following: a subscription permanent identifier (SUPI) or a permanent equipment identifier (PEI) of the UE, a PDU session identifier, a data network name (DNN), single network slice selection assistance information (S-NSSAI), a radio access technology (RAT) type, and the like. After receiving the message, the H-PCF determines the authorization policy based on local configuration or subscription information of the UE and/or subscription information of a session that are/is obtained from a UDR, and sends the authorization policy to the H-SMF by using an Npcf interface SM policy control establishment response (Npcf_SMPolicyControl_Create Response) message. It may be understood that the foregoing descriptions are merely an example for ease of understanding. This is not limited.

It should be noted that the H-SMF may locally configure the authorization policy. In this case, the H-PCF may not send the authorization policy to the H-SMF.

603: The H-SMF sends the authorization policy to the V-SMF.

The authorization policy indicates that offloading is allowed in the VPLMN.

In a possible implementation, the HR session establishment procedure is reused. For example, the H-SMF receives a session establishment request message from the V-SMF, sends a session establishment response message to the V-SMF, and includes the authorization policy in the session establishment response message. It may be understood that the authorization policy may be received from the H-PCF in step 602, or may be locally configured.

Optionally, the authorization policy includes a target FQDN #1 (or an FQDN range), and the target FQDN #1 may include one or more FQDNs. The target FQDN #1 includes an FQDN corresponding to a service that is allowed to be offloaded in the VPLMN, and/or an FQDN corresponding to a service that is not allowed to be offloaded in the VPLMN. For example, the target FQDN #1 includes the FQDN corresponding to the service that is allowed to be offloaded in the VPLMN. Specifically, when an FQDN of a service matches the target FQDN #1, the service is allowed to be offloaded in the VPLMN.

604: The V-SMF determines an offloading point based on a location of the UE and according to the authorization policy.

In other words, in step 310 in the method 300, that a first session management network element determines an offloading point in a visited network may include: The first session management network element determines the offloading point based on the location of the UE and according to the authorization policy. For example, if the authorization policy indicates that offloading is allowed in the VPLMN, the V-SMF may insert the offloading point based on the location of the UE. It may be understood that if the authorization policy indicates that offloading is not allowed in the VPLMN, the V-SMF may not need to insert the offloading point.

The offloading point may include, for example, a UL CL or a BP. Alternatively, the offloading point may further include an L-PSA. The UL CL may be the same as or different from a V-UPF serving an HR session. This is not limited.

605: The V-SMF sends an offloading rule to the offloading point.

The V-SMF may determine the offloading rule, and send the offloading rule to the offloading point. The offloading rule includes an IP range, and is for offloading, to the L-PSA, a packet for accessing the IP range.

In a possible implementation, the V-SMF determines an offloading rule based on locally configured EAS deployment information.

In another possible implementation, if the authorization policy in step 603 includes the target FQDN #1, the V-SMF may determine an offloading rule based on the target FQDN #1.

For the foregoing two methods, refer to descriptions in the method 300. Details are not described herein again.

The V-SMF may send the offloading rule to the offloading point by using, for example, an N4 session modification request or an N4 session establishment request. For details, refer to descriptions in step 506. Details are not described herein again.

Optionally, if the UL CL is different from the V-UPF serving the HR session, the method 600 may further include step 607 and step 608.

606: The V-SMF sends an address of an H-EASDF to the UE.

Step 606 is similar to step 507. Details are not described herein again.

607: The V-SMF sends tunnel information to the H-SMF.

The tunnel information may be tunnel information of the UL CL, and the UL CL is the UL CL determined in step 604.

In a possible implementation, the HR session establishment procedure is reused. For example, the V-SMF sends an Nsmf_PDUSession_Update Request message to the H-SMF, where the message carries the tunnel information.

608: The H-SMF sends the tunnel information to an H-UPF.

In a possible implementation, the H-SMF reuses the HR session establishment procedure. To be specific, the H-SMF sends an N4 session modification request message to the H-UPF, where the N4 session modification request message includes the tunnel information. Correspondingly, the H-UPF may send an N4 session modification response message to the H-SMF.

Based on the method 600, the V-SMF may insert the offloading point according to the authorization policy obtained from the HPLMN, and send the offloading rule to the offloading point, to implement local offloading in the VPLMN in an HR roaming scenario.

Figure 7:
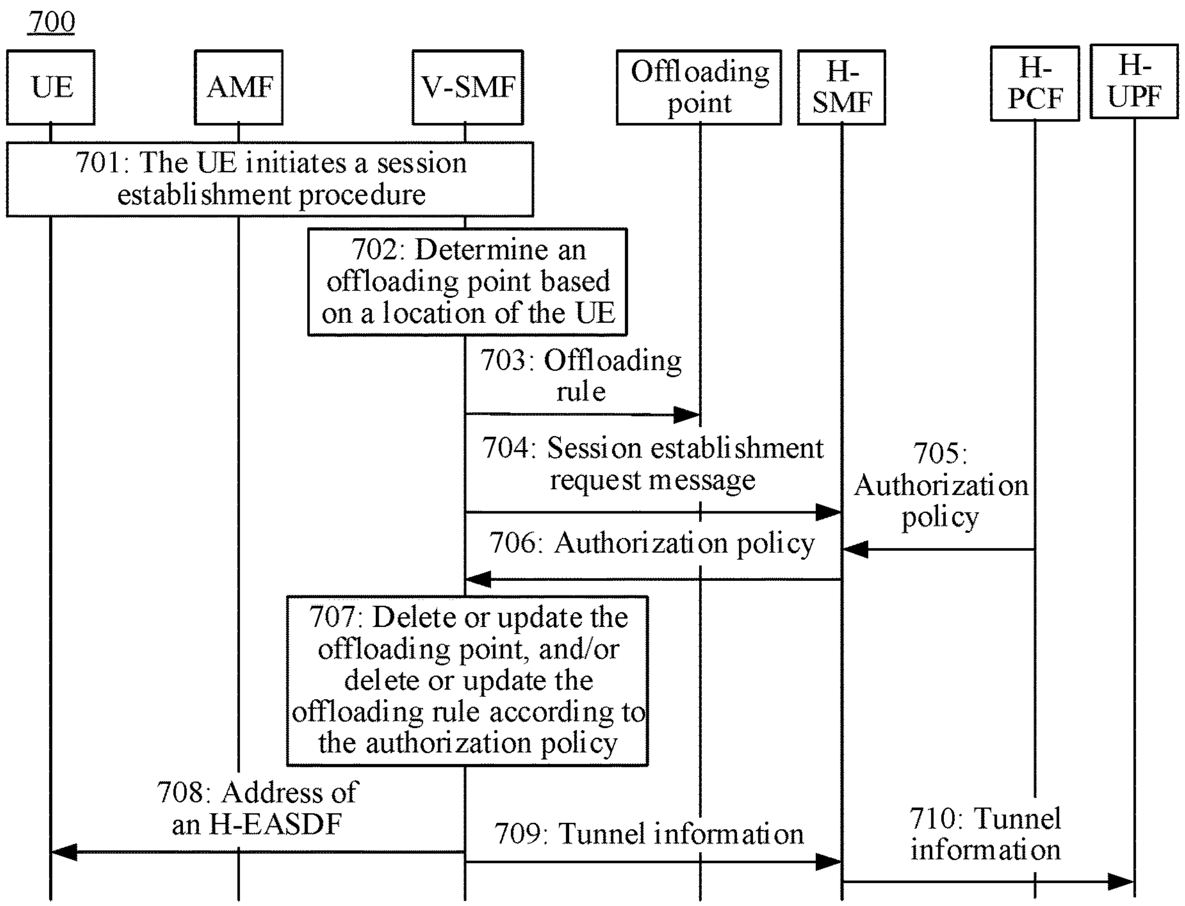
FIG. 7 is a schematic flowchart of another communication method according to an embodiment of this application.

FIG. 7 is a schematic flowchart of another communication method 700 according to an embodiment of this application. The method 700 may be used to implement the solution as shown in the method 400. For example, the method 700 may be used in a scenario in which a V-SMF inserts an offloading point in advance. The method 700 may include the following steps.

701: UE initiates a session establishment procedure.

Step 701 is similar to step 502. Details are not described herein again.

702: The V-SMF determines the offloading point based on a location of the UE.

The offloading point may include, for example, a UL CL or a BP, and an L-PSA. The UL CL may be the same as or different from a V-UPF serving an HR session. This is not limited.

703: The V-SMF sends an offloading rule to the offloading point.

Step 703 is similar to step 506. Details are not described herein again.

704: The V-SMF sends a session establishment request message to an H-SMF.

In a possible implementation, an HR session establishment procedure is reused. The V-SMF sends an Nsmf interface PDU session establishment request (Nsmf_PDUSession_Create Request) message to the H-SMF.

It should be understood that the Nsmf_PDUSession_Create Request message is merely an example for description. This is not limited.

705: An H-PCF sends an authorization policy to the H-SMF.

The authorization policy indicates (or represents) whether offloading is allowed in a VPLMN (or the authorization policy indicates (or represents) whether offloading is allowed). For the authorization policy, refer to descriptions about the information #A in the foregoing method 300. Details are not described herein again.

Step 705 is similar to step 602. Details are not described herein again.

706: The H-SMF sends the authorization policy to the V-SMF.

For example, after receiving the session establishment request message from the V-SMF, the H-SMF sends a session establishment response message to the V-SMF, and includes the authorization policy in the session establishment response message. It may be understood that the authorization policy may be locally configured by the H-SMF, or may be received from the H-PCF in step 706. Alternatively, both a locally configured authorization policy and an authorization policy received from the H-PCF exist. The H-SMF may send either of the authorization policies. For example, the H-SMF sends, to the V-SMF, the authorization policy received from the H-PCF.

In a possible implementation, the HR session establishment procedure is reused. The H-SMF sends an Nsmf interface PDU session establishment response (Nsmf_PDUSession_Create Response) message to the V-SMF.

It should be understood that the Nsmf_PDUSession_Create Response message is merely an example for description. This is not limited.

In a first possible case, the authorization policy indicates that offloading is allowed in the VPLMN. In this case, the V-SMF may directly send an address of an H-EASDF to the UE. In other words, step 707, step 709, and step 710 may not be performed.

In a second possible case, the authorization policy indicates that offloading is not allowed in the VPLMN, or the authorization policy indicates that a packet corresponding to a target FQDN #2 (or an FQDN range) is allowed to be offloaded in the visited network. In this case, the method 700 may include step 707, step 709, and step 710.

707: The V-SMF deletes or updates the offloading point, and/or deletes or updates the offloading rule according to the authorization policy.

For example, if the authorization policy received by the V-SMF indicates that offloading is not allowed in the VPLMN, the V-SMF may delete or update the offloading point. For example, the V-SMF may delete one or more of the following: the L-PSA, the UL CL, and an offloading rule of the UL CL. In an example, when the UL CL is different from the V-UPF selected for the HR session, the V-SMF may delete the UL CL. Deleting the UL CL also refers to deleting the offloading rule of the UL CL. In an example, when the UL CL is the same as the V-UPF selected for the HR session, the V-SMF may delete the offloading rule of the UL CL.

For another example, if the authorization policy indicates that the packet corresponding to the target FQDN #2 is allowed to be offloaded in the visited network, the V-SMF update one or more of the following: the UL CL, the L-PSA, and an offloading rule of the UL CL. Optionally, the V-SMF may perform one or more of the following: re-selecting an offloading point, determining a new offloading point and sending an offloading rule to the new offloading point, and deleting the offloading rule of the old offloading point. For details, refer to the third possible case in the method 400. The details are not described herein again.

708: The V-SMF sends the address of the H-EASDF to the UE.

Step 708 is similar to step 507. Details are not described herein again.

Optionally, if the method 700 includes step 707, to be specific, the V-SMF deletes or updates the offloading point, the method 700 may further include step 709 and step 710.

709: The V-SMF sends tunnel information to the H-SMF.

The tunnel information may be tunnel information of the UL CL, tunnel information of a UPF, or the like.

In a first possible case, if the UL CL is updated in step 707, the UL CL in step 709 is an updated UL CL. In other words, the V-SMF sends updated tunnel information to the H-SMF.

In a second possible case, if the UL CL is deleted in step 707, and the UL CL is different from the original V-UPF serving the HR session, the V-SMF sends tunnel information of the original V-UPF to the H-SMF.

In a possible implementation, the V-SMF reuses the HR session establishment procedure. For example, the V-SMF sends an Nsmf interface PDU session update request (Nsmf_PDUSession_Update Request) message to the H-SMF, where the message carries the tunnel information.

710: The H-SMF sends the tunnel information to an H-UPF.

In a possible implementation, the H-SMF reuses the HR session establishment procedure. To be specific, the H-SMF sends an N4 session modification request message to the H-UPF, where the N4 session modification request message includes the tunnel information. Correspondingly, the H-UPF may send an N4 session modification response message to the H-SMF.

Based on the method 700, the V-SMF may insert the offloading point in advance, and then determine, according to an authorization policy obtained from an HPLMN, whether to delete or update the offloading point, and/or delete or update the offloading rule.

Figure 8:
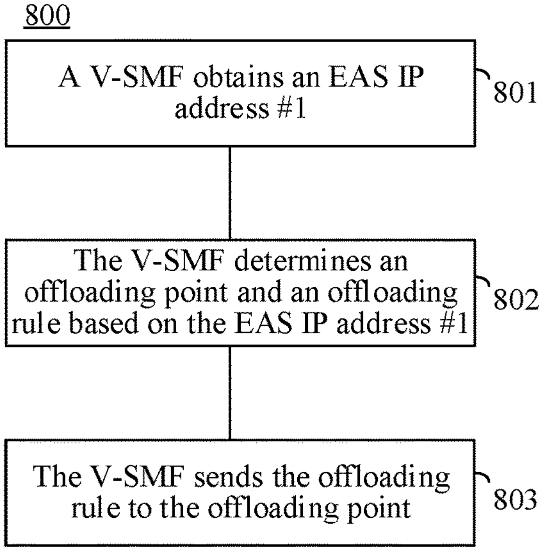
FIG. 8 is a schematic flowchart of another communication method according to an embodiment of this application.

FIG. 8 is a schematic flowchart of another communication method 800 according to an embodiment of this application. The method 800 may be used in a scenario in which a V-SMF determines an offloading rule based on obtained address information. The method 800 may include the following steps.

801: The V-SMF obtains an EAS IP address #1.

The EAS IP address #1 is an EAS IP address corresponding to a service deployed in a VPLMN, and the IP address may be an EAS IP address determined for a terminal device. For example, when UE accesses a service in the VPLMN, the EAS IP address #1 is an EAS IP address determined (or selected) for the UE.

In an example, the V-SMF receives the EAS IP address #1 from an H-SMF.

It should be noted that a method of obtaining the EAS IP address #1 is not limited in this application. In a possible implementation, an EASDF sends a DNS request message to a DNS server, and receives a DNS response message from the DNS server, where the DNS response message includes the EAS IP address #1. After receiving the DNS response message, the EASDF sends, to the H-SMF, the EAS IP address #1 included in the DNS response message. After receiving the EAS IP address #1, the H-SMF sends the EAS IP address #1 to the V-SMF.

802: The V-SMF determines an offloading point and an offloading rule based on the EAS IP address #1.

As described in the foregoing method 300, the information #A represents (or indicates) whether offloading is allowed in the VPLMN. It may be further described as that, the information #A represents (or indicates) whether the offloading point is allowed to be determined in (selected in or inserted into) the VPLMN, or the information #A may represent (or indicate) whether the offloading point is allowed to be determined (selected or inserted). The method 800 includes at least the following two implementations.

In a possible method, the information #A is the EAS IP address #1. In other words, if the V-SMF receives the EAS IP address #1, the V-SMF determines (or inserts) the offloading point. For example, the V-SMF may determine (or insert) the offloading point based on the EAS IP address #1 and/or local configuration, where the local configuration may be EAS deployment information or the like. It may be understood that, in this method, for a transmit end (for example, the H-SMF), the H-SMF sends the EAS IP address #1 to the V-SMF. For the V-SMF at a receive end, the EAS IP address #1 may be for triggering the V-SMF to determine (or insert) the offloading point. In other words, after receiving the EAS IP address #1, the V-SMF may determine (or insert) the offloading point based on the EAS IP address #1 and the EAS deployment information.

In another possible method, if the V-SMF receives the EAS IP address #1, the V-SMF obtains the information #A (where for example, the information #A is locally configured, or the information #A is received from the H-SMF. For details, refer to descriptions in the method 300). If the information #A represents that offloading is allowed in the VPLMN (or offloading is allowed), the V-SMF determines (or inserts) the offloading point. For example, the V-SMF may determine (or insert) the offloading point based on one or more of the following: the EAS IP address #1, the information #A, and the local configuration. The local configuration may be the EAS deployment information or the like. It may be understood that, in this method, for a transmit end (for example, the H-SMF), the H-SMF sends the EAS IP address #1 to the V-SMF. For the V-SMF at a receive end, the EAS IP address #1 may be for triggering, with reference to the information #A, the V-SMF to determine (or insert) the offloading point. In other words, after receiving the EAS IP address #1, if the information #A represents that offloading is allowed in the VPLMN (or offloading is allowed), the V-SMF may determine (or insert) the offloading point based on the EAS IP address #1, the information #A (for example, based on an FQDN or an IP address range included in the information #A), and the EAS deployment information.

The V-SMF may further determine the offloading rule. The determined offloading rule is for offloading a service to the VPLMN. Specifically, the service may be described by using one or more of a source IP, a destination IP, a source port number, and a destination port number. For example, the offloading rule may be for offloading, to the VPLMN, a corresponding packet for accessing the EAS IP address #1. Specifically, according to the offloading rule, when a destination IP address of a packet matches the EAS IP address #1, local offloading is performed on the packet in the VPLMN.

In a possible method, the V-SMF may determine the offloading rule based on one or more of the following: the EAS IP address #1, the information #A, and the local configuration. The local configuration may be the EAS deployment information or the like.

For example, if the V-SMF receives the EAS IP address #1, the V-SMF determines the offloading rule (for example, the V-SMF may determine the offloading rule based on the EAS IP address #1 and/or the local configuration).

For another example, if the V-SMF receives the EAS IP address #1, the V-SMF obtains the information #A (where for example, the information #A is locally configured, or the information #A is received from the H-SMF. For details, refer to descriptions in the method 300). If the information #A indicates that offloading is allowed in the VPLMN (or offloading is allowed), the V-SMF determines the offloading rule (for example, the V-SMF may determine the offloading rule based on one or more of the EAS IP address #1, the information #A, and local configuration).

For another example, if determining the offloading point, the V-SMF may perform an action of determining the offloading rule (for example, the V-SMF may determine the offloading rule based on one or more of the EAS IP address #1, the information #A, and the local configuration).

It may be understood that the foregoing is merely an example for description. This application is not limited thereto. For example, if receiving the EAS IP address #1, the V-SMF may process the offloading point or the offloading rule. For details, refer to descriptions in the method 400. Details are not described again.

803: The V-SMF sends the offloading rule to the offloading point.

The offloading rule includes the EAS IP address #1, and is for offloading, to an L-PSA, the packet for accessing the EAS IP address #1.

The V-SMF may send the offloading rule to the offloading point by using, for example, an N4 session modification request or an N4 session establishment request. For details, refer to descriptions in step 506. Details are not described herein again.

Based on the method 800, the V-SMF may determine the offloading point and the offloading rule based on the obtained address information, to implement local EAS discovery and local offloading in the VPLMN in an HR roaming scenario.

It may be understood that the method 800 is merely a simple example for description. This is not limited. For example, before step 802, the method 800 further includes: An H-PCF sends an authorization policy to the H-SMF, the H-SMF sends the authorization policy to the V-SMF, and the like. For another example, after step 803, the method 800 may further include steps such as sending, by the V-SMF, an address of an H-EASDF to the UE.

It may be further understood that the examples in FIG. 5 to FIG. 8 in embodiments of this application are provided merely to help a person skilled in the art understand embodiments of this application, instead of limiting embodiments of this application to specific scenarios shown in the examples. It is clear that, a person skilled in the art can make various equivalent modifications or changes based on the examples shown in FIG. 5 to FIG. 8, and such modifications or changes also fall within the scope of embodiments of this application. For example, the session establishment procedures in FIG. 5 to FIG. 8 may alternatively be replaced with session modification procedures. For another example, the UL CL mentioned in the foregoing embodiments may be replaced with a BP, or another network element or module that can perform an offloading function.

It may be further understood that, in some of the foregoing embodiments, message names such as the Nsmf_PDUSession_Update Request message and the Nsmf_PDUSession_Context Request message are merely examples, and do not limit the protection scope of embodiments of this application.

It should be further understood that in some of the foregoing embodiments, the FQDN is mainly used as an example for description. This application is not limited thereto. For example, the FQDN may alternatively be replaced with any one or more of an IP address and an AppID.

It may be further understood that embodiments of this application may be used in a plurality of scenarios, for example, a scenario in which a V-UPF does not have a capability of parsing a DNS message and no L-DNS server is deployed in a VPLMN.

It may be further understood that some optional features in embodiments of this application may not depend on another feature in some scenarios, or may be combined with another feature in some scenarios. This is not limited.

It may be further understood that the solutions in embodiments of this application may be properly combined for use, and explanations or descriptions of terms in embodiments may be mutually referred to or explained in embodiments. This is not limited.

It may be further understood that values of various numeric sequence numbers in embodiments of this application do not mean execution sequences, merely for differentiation for ease of description, and should not constitute any limitation on an implementation process of embodiments of this application.

It may be further understood that, in the foregoing method embodiments, methods and operations implemented by a device may alternatively be implemented by a component (for example, a chip or a circuit) of the device.

Corresponding to the methods provided in the foregoing method embodiments, embodiments of this application further provide corresponding apparatuses. The apparatus includes corresponding modules configured to perform the foregoing method embodiments. The module may be software, hardware, or a combination of software and hardware. It may be understood that the technical features described in the method embodiments are also applicable to the following apparatus embodiments.

Figure 9:
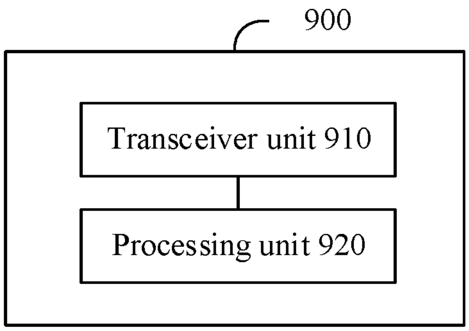
FIG. 9 is a schematic block diagram of a communication apparatus according to an embodiment of this application.

FIG. 9 is a schematic block diagram of a communication apparatus according to an embodiment of this application. The apparatus 900 includes a transceiver unit 910 and a processing unit 920. The transceiver unit 910 may be configured to implement a corresponding communication function. The transceiver unit 910 may also be referred to as a communication interface or a communication unit. The processing unit 920 may be configured to implement a corresponding processing function, for example, determine an offloading point.

Optionally, the apparatus 900 further includes a storage unit. The storage unit may be configured to store instructions and/or data. The processing unit 920 may read the instructions and/or data in the storage unit, so that the apparatus implements actions of the devices or network elements in the foregoing method embodiments.

In a first design, the apparatus 900 may be the first session management network element in the foregoing embodiments, or may be a component (for example, a chip) of the first session management network element. The apparatus 900 may implement corresponding steps or procedures performed by the first session management network element in the foregoing method embodiments. The transceiver unit 910 may be configured to perform operations related to sending and receiving of the first session management network element in the foregoing method embodiments. The processing unit 920 may be configured to perform operations related to processing of the first session management network element in the foregoing method embodiments.

In a first possible implementation, the processing unit 920 is configured to determine an offloading point in a visited network based on first information, where the first information indicates that offloading is allowed in the visited network, and the first session management network element is a network element deployed in the visited network. The transceiver unit 910 is configured to send an offloading rule to the offloading point, where the offloading rule is for offloading a packet to the visited network.

Optionally, the processing unit 920 is further configured to determine the offloading rule based on a first service, where the first service is a service that is allowed to be offloaded in the visited network.

For example, the first information includes an identifier of the first service, and the first information indicates that the first service is allowed to be offloaded in the visited network.

Optionally, the processing unit 920 is further configured to determine the offloading rule based on configuration information and/or the first information.

Optionally, the transceiver unit 910 is further configured to receive first information from a second session management network element, where the second session management network element is a network element deployed in a home network; or locally configure, by the first session management network element, the first information.

For example, the offloading point is an uplink classifier or a branching point.

In a second possible implementation, the processing unit 920 is configured to determine an offloading point in a visited network, where the first session management network element is a network element deployed in the visited network. The transceiver unit 910 is configured to send an offloading rule to the offloading point, where the offloading rule is for offloading a packet to the visited network. The transceiver unit 910 is further configured to receive first information, where the first information indicates whether offloading is allowed in the visited network.

Optionally, the processing unit 920 is configured to delete or update the offloading rule based on the first information.

Optionally, that the processing unit 920 is configured to delete or update the offloading rule based on the first information includes: The processing unit 920 is configured to delete the offloading rule if the first information indicates that offloading is not allowed in the visited network.

Optionally, that the processing unit 920 is configured to delete or update the offloading rule based on the first information includes: The processing unit 920 is configured to update the offloading rule based on a first service if the first information indicates that the first service is allowed to be offloaded in the visited network.

Optionally, the processing unit 920 is configured to delete or update the offloading point based on the first information.

Optionally, that the processing unit 920 is configured to delete or update the offloading point based on the first information includes: The processing unit 920 is configured to delete the offloading point if the first information indicates that offloading is not allowed in the visited network.

Optionally, that the processing unit 920 is configured to delete or update the offloading point based on the first information includes: The processing unit 920 is configured to update the offloading point based on a first service if the first information indicates that the first service is allowed to be offloaded in the visited network.

Optionally, the transceiver unit 910 is further configured to send updated tunnel information to a second session management network element.

Optionally, the transceiver unit 910 is configured to receive the first information from the second session management network element, where the second session management network element is a network element deployed in a home network.

For example, the offloading point is an uplink classifier or a branching point.

In a second design, the apparatus 900 may be the second session management network element in the foregoing embodiments, or may be a component (for example, a chip) of the second session management network element. The apparatus 900 may implement corresponding steps or procedures performed by the second session management network element in the foregoing method embodiments. The transceiver unit 910 is configured to perform operations related to sending and receiving of the second session management network element in the foregoing method embodiments. The processing unit 920 is configured to perform operations related to processing of the second session management network element in the foregoing method embodiments.

In a possible implementation, the transceiver unit 910 is configured to obtain first information, where the first information indicates whether offloading is allowed in a visited network. The transceiver unit 910 is further configured to send the first information to a first session management network element, where the first session management network element is a network element deployed in the visited network, and the second session management network element is a network element deployed in a home network.

Optionally, the transceiver unit 910 is further configured to send a first service to the first session management network element, where the first service is a service that is allowed to be offloaded in the visited network.

For example, the first information includes the identifier of the first service, and the first information indicates that the first service is allowed to be offloaded in the visited network.

Optionally, that the transceiver unit 910 is configured to obtain first information includes: The transceiver unit 910 is configured to receive the first information from a policy control network element, where the policy control network element is a network element deployed in the home network; or locally configure, by the second session management network element, the first information.

In a third design, the apparatus 900 may be the policy control network element in the foregoing embodiments, or may be a component (for example, a chip) of the policy control network element. The apparatus 900 may implement corresponding steps or procedures performed by the policy control network element in the foregoing method embodiments. The transceiver unit 910 is configured to perform operations related to sending and receiving of the policy control network element in the foregoing method embodiments. The processing unit 920 is configured to perform operations related to processing of the policy control network element in the foregoing method embodiments.

In a possible implementation, the transceiver unit 910 is configured to obtain first information, where the first information indicates whether offloading is allowed in a visited network. The transceiver unit 910 is further configured to send the first information to a second session management network element, where the second session management network element and the policy control network element are network elements deployed in a home network.

Optionally, the transceiver unit 910 is further configured to send an identifier of a first service to the second session management network element, where the first service is a service that is allowed to be offloaded in the visited network.

For example, the first information includes the identifier of the first service, and the first information indicates that the first service is allowed to be offloaded in the visited network.

It should be understood that a specific process in which the units perform the foregoing corresponding steps is described in detail in the foregoing method embodiments. For brevity, details are not described herein again.

It should be further understood that the apparatus 900 herein is embodied in a form of a functional unit. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another proper component that supports the described functions. In an optional example, a person skilled in the art may understand that the apparatus 900 may be specifically the first session management network element in the foregoing embodiments, and may be configured to perform procedures and/or steps corresponding to the first session management network element in the foregoing method embodiments. Alternatively, the apparatus 900 may be specifically the second session management network element in the foregoing embodiments, and may be configured to perform procedures and/or steps corresponding to the second session management network element in the foregoing method embodiments. Alternatively, the apparatus 900 may be specifically the policy control network element in the foregoing embodiments, and may be configured to perform procedures and/or steps corresponding to the policy control network element in the foregoing method embodiments. To avoid repetition, details are not described herein again.

The apparatus 900 in each of the foregoing solutions has a function of implementing a corresponding step performed by a core network element (for example, the first session management network element, the second session management network element, or the policy control network element) in the foregoing method. The function may be implemented by hardware, or may be implemented by hardware executing corresponding software. The hardware or software includes one or more modules corresponding to the foregoing function. For example, the transceiver unit may be replaced with a transceiver (for example, a sending unit in the transceiver unit may be replaced with a transmitter, and a receiving unit in the transceiver unit may be replaced with a receiver), and another unit such as the processing unit may be replaced with a processor, to separately perform sending and receiving operations and a related processing operation in the method embodiments.

In addition, the transceiver unit 910 may alternatively be a transceiver circuit (for example, may include a receive circuit and a transmit circuit), and the processing unit may be a processing circuit.

It should be noted that the apparatus in FIG. 9 may be the network element or the device in the foregoing embodiments, or may be a chip or a chip system, for example, a system on chip (SoC). The transceiver unit may be an input/output circuit or a communication interface. The processing unit is a processor, a microprocessor, or an integrated circuit integrated on the chip. This is not limited herein.

Figure 10:
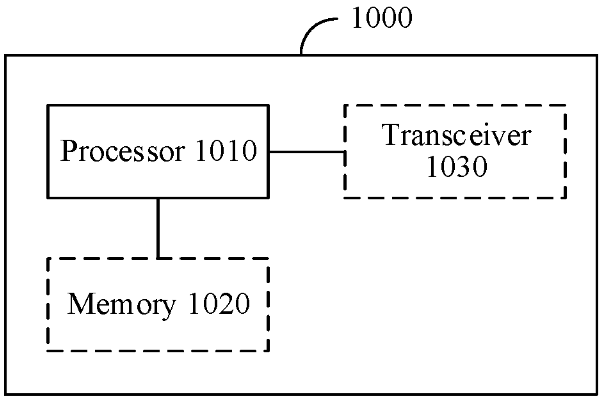
FIG. 10 is a schematic block diagram of another communication apparatus according to an embodiment of this application.

As shown in FIG. 10, an embodiment of this application provides another communication apparatus 1000. The apparatus 1000 includes a processor 1010. The processor 1010 is configured to execute a computer program or instructions stored in a memory 1020, or read data/signaling stored in the memory 1020, to perform the methods in the foregoing method embodiments. Optionally, there are one or more processors 1010.

Optionally, as shown in FIG. 10, the apparatus 1000 further includes the memory 1020. The memory 1020 is configured to store the computer program or the instructions and/or the data. The memory 1020 may be integrated with the processor 1010, or may be disposed separately. Optionally, there are one or more memories 1020.

Optionally, as shown in FIG. 10, the apparatus 1000 further includes a transceiver 1030, and the transceiver 1030 is configured to receive and/or send a signal. For example, the processor 1010 is configured to control the transceiver 1030 to receive and/or send a signal.

In a solution, the apparatus 1000 is configured to implement operations performed by a core network element in the foregoing method embodiments.

For example, the processor 1010 is configured to execute the computer program or the instructions stored in the memory 1020, to implement related operations of the first session management network element in the foregoing method embodiments. For example, the method performed by the first session management network element in the embodiment shown in FIG. 3 or FIG. 4 is implemented, or the method performed by the V-SMF in any one of embodiments shown in FIG. 5 to FIG. 8 is implemented.

For another example, the processor 1010 is configured to execute the computer program or the instructions stored in the memory 1020, to implement related operations of the second session management network element in the foregoing method embodiments. For example, the method performed by the second session management network element in the embodiment shown in FIG. 3 or FIG. 4 is implemented, or the method performed by the H-SMF in any one of embodiments shown in FIG. 5 to FIG. 8 is implemented.

For another example, the processor 1010 is configured to execute the computer program or the instructions stored in the memory 1020, to implement related operations of the policy control network element in the foregoing method embodiments. For example, the method performed by the policy control network element in the embodiment shown in FIG. 3 or FIG. 4 is implemented, or the method performed by the H-PCF in any one of embodiments shown in FIG. 5 to FIG. 8 is implemented.

It should be understood that, the processor mentioned in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It should be further understood that the memory mentioned in embodiments of this application may be a volatile memory and/or a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example but not limitation, the RAM includes the following plurality of forms: a static random access memory (static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is the general-purpose processor, the DSP, the ASIC, the FPGA or the another programmable logic device, the discrete gate or the transistor logic device, or the discrete hardware component, the memory (storage module) may be integrated into the processor.

It should further be noted that the memory described in this specification includes but is not limited to these memories and any memory of another proper type.

An embodiment of this application further provides a computer-readable storage medium. The computer-readable storage medium stores computer instructions for implementing the method performed by the core network element in the foregoing method embodiments.

For example, when a computer program is executed by a computer, the computer is enabled to implement the method performed by the first session management network element in the foregoing method embodiments.

For another example, when a computer program is executed by a computer, the computer is enabled to implement the method performed by the second session management network element in the foregoing method embodiments.

For another example, when a computer program is executed by a computer, the computer is enabled to implement the method performed by the policy control network element in the foregoing method embodiments.

An embodiment of this application further provides a computer program product, including instructions. When the instructions are executed by a computer, the computer is enabled to implement the method performed by the core network element in the foregoing method embodiments.

An embodiment of this application further provides a communication system, including one or more of the first session management network element, the second session management network element, and the policy control network element.

For explanations and beneficial effects of related content of any one of the apparatuses provided above, refer to the corresponding method embodiment provided above. Details are not described herein again.

In the several embodiments provided in this application, it should be understood that the disclosed apparatus and method may be implemented in other methods. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

All or some of the foregoing embodiments may be implemented by software, hardware, firmware, or any combination thereof. When software is for implementing embodiments, all or some of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, a digital subscriber line (DSL)) or wireless (for example, infrared, radio, or microwave) method. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. For example, the usable medium includes but is not limited to any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

receiving, by a first session management network element in a visited network, first information from a second session management network element in a home network, wherein the first information indicates that offloading is allowed in the visited network;

determining, by the first session management network element, an offloading point in the visited network based on the first information;

determining, by the first session management network element, an offloading rule based on the first information and edge application server deployment information in the visited network; and sending, by the first session management network element, the offloading rule to the offloading point, wherein the offloading rule is for offloading a packet to the visited network.

2. The method according to claim 1, wherein the edge application server deployment information is locally configured in the first session management network element, or the edge application server deployment information is received from an application function.

3. The method according to claim 1, wherein the edge application server deployment information comprises a fully qualified domain name range corresponding to a service deployed in the visited network, and the first information comprises a fully qualified domain name range corresponding to a service allowed to be offloaded in the visited network.

4. The method according to claim 3, wherein the fully qualified domain name range corresponding to the service deployed in the visited network and the fully qualified domain name range corresponding to the service allowed to be offloaded in the visited network have an intersection part, and the offloading rule is that a packet corresponding to a fully qualified domain name in the intersection part is offloaded to the visited network.

5. The method according to claim 1, wherein the edge application server deployment information comprises an internet protocol range corresponding to a service deployed in the visited network, and the first information comprises an internet protocol range corresponding to a service allowed to be offloaded in the visited network.

6. The method according to claim 5, wherein the internet protocol range corresponding to the service deployed in the visited network and the internet protocol range corresponding to the service allowed to be offloaded in the visited network have an intersection part, and the offloading rule is that a packet corresponding to an IP in the intersection part is offloaded to the visited network.

7. A communication apparatus, comprising:

at least one processor; and at least one memory coupled to the at least one processor and storing programming instructions that, when executed by the at least one processor, cause the apparatus to:

receive first information from a session management network element in a home network, wherein the first information indicates that offloading is allowed in a visited network;

determine an offloading point in the visited network based on the first information;

determine an offloading rule based on the first information and edge application server deployment information in the visited network; and send the offloading rule to the offloading point, wherein the offloading rule is for offloading a packet to the visited network.

8. The communication apparatus according to claim 7, wherein the edge application server deployment information is locally configured in the communication apparatus, or the edge application server deployment information is received from an application function.

9. The communication apparatus according to claim 7, wherein the edge application server deployment information comprises a fully qualified domain name range corresponding to a service deployed in the visited network, and the first information comprises a fully qualified domain name range corresponding to a service allowed to be offloaded in the visited network.

10. The communication apparatus according to claim 7, wherein the fully qualified domain name range corresponding to the service deployed in the visited network and the fully qualified domain name range corresponding to the service allowed to be offloaded in the visited network have an intersection part, and the offloading rule is that a packet corresponding to a fully qualified domain name in the intersection part is offloaded to the visited network.

11. The communication apparatus according to claim 7, wherein the edge application server deployment information comprises an internet protocol range corresponding to a service deployed in the visited network, and the first information comprises an internet protocol range corresponding to a service allowed to be offloaded in the visited network.

12. The communication apparatus according to claim 7, wherein the internet protocol range corresponding to the service deployed in the visited network and the internet protocol range corresponding to the service allowed to be offloaded in the visited network have an intersection part, and the offloading rule is that a packet corresponding to an IP in the intersection part is offloaded to the visited network.

13. The method according to claim 1, further comprising:

receiving, by the offloading point, the offloading rule.

14. The method according to claim 1, further comprising:

obtaining, by the second session management network element, the first information; and sending, by the second session management network element, the first information to the first session management network element.

15. The method according to claim 14, further comprising:

obtaining, by a policy control network element in a home network, the first information; and sending, by the policy control network element, the first information to the second session management network element.

16. A communication system, comprising:

a first session management network element in a visited network and an offloading point in the visited network, wherein the first session management network element is configured to:

receive first information from a second session management network element in a home network, wherein the first information indicates that offloading is allowed in the visited network;

determine the offloading point in the visited network based on the first information;

determine an offloading rule based on the first information and edge application server deployment information in the visited network; and send the offloading rule to the offloading point, wherein the offloading rule is for offloading a packet to the visited network;

wherein the offloading point is configured to:

receive the offloading rule.

17. The communication system according to claim 16, wherein the second session management network element configured to:

obtain the first information; and send the first information to the first session management network element.

18. The communication system according to claim 17, further comprising: a policy control network element in the home network configured to:

obtain the first information; and send the first information to the second session management network element.

* * * * *